US009707761B2

(12) United States Patent
Faralli et al.

(10) Patent No.: US 9,707,761 B2
(45) Date of Patent: Jul. 18, 2017

(54) PROCESS FOR MANUFACTURING A NOZZLE PLATE

(71) Applicants: STMicroelectronics S.r.l., Agrate Brianza (IT); STMicroelectronics, Inc., Coppell, TX (US)

(72) Inventors: Dino Faralli, Milan (IT); Michele Palmieri, Corvallis, OR (US)

(73) Assignees: STMICROELECTRONICS S.R.L., Agrate Brianza (IT); STMICROELECTRONICS, INC., Coppell, TX (US)

( * ) Notice: Subject to any disclaimer, the term of this patent is extended or adjusted under 35 U.S.C. 154(b) by 236 days.

(21) Appl. No.: 14/523,625

(22) Filed: Oct. 24, 2014

(65) Prior Publication Data

US 2015/0040397 A1 Feb. 12, 2015

Related U.S. Application Data

(62) Division of application No. 13/891,609, filed on May 10, 2013, now abandoned.

(30) Foreign Application Priority Data

May 11, 2012 (IT) .............................. TO2012A0426

(51) Int. Cl.

*B21D 53/76* (2006.01)
*B23P 17/00* (2006.01)
(Continued)

(52) U.S. Cl.

CPC ............. *B41J 2/162* (2013.01); *B41J 2/1433* (2013.01); *B41J 2/1601* (2013.01); *B41J 2/164* (2013.01);
(Continued)

(58) Field of Classification Search

CPC ...... B41J 2/162; B41J 2/1433; B41J 2/14129; B41J 2/16; B41J 2202/15; B41J 2/1606;
(Continued)

(56) References Cited

U.S. PATENT DOCUMENTS 6,341,836 B1 1/2002 Koike et al.
6,561,624 B1 * 5/2003 Kikugawa .............. B41J 2/1606 347/45
(Continued)

FOREIGN PATENT DOCUMENTS

JP 2001191540 A 7/2001
WO 02/098666 A1 12/2002
(Continued)

OTHER PUBLICATIONS

Italian Search Report, dated Jan. 7, 2013 for Italian Application No. TO20120426, 9 pages.

*Primary Examiner* — Thiem Phan
(74) *Attorney, Agent, or Firm* — Seed Intellectual Property Law Group LLP

(57) ABSTRACT

A nozzle plate for a fluid-ejection device, comprising: a first substrate made of semiconductor material, having a first side and a second side; a structural layer extending on the first side of the first substrate, the structural layer having a first side and a second side, the second side of the structural layer facing the first side of the first substrate; at least one first through hole, having an inner surface, extending through the structural layer, the first through hole having an inlet section corresponding to the first side of the structural layer and an outlet section corresponding to the second side of the structural layer; a narrowing element adjacent to the surface of the first through hole, and including a tapered portion
(Continued)

such that the inlet section of the first through hole has an area larger than a respective area of the outlet section of the first through hole.

21 Claims, 12 Drawing Sheets

(51) Int. Cl.
*B41J 2/16* (2006.01)
*B41J 2/14* (2006.01)

(52) U.S. Cl.
CPC ........... *B41J 2/1623* (2013.01); *B41J 2/1626* (2013.01); *B41J 2/1628* (2013.01); *B41J 2/1629* (2013.01); *B41J 2/1632* (2013.01); *B41J 2/1639* (2013.01); *B41J 2/1642* (2013.01); *B41J 2002/14475* (2013.01); *Y10T 29/49401* (2015.01)

(58) Field of Classification Search
CPC ......... B81B 2201/052; Y10T 29/49401; Y10T 29/49432; Y10T 29/494
USPC ................. 29/890.1, 25.35, 890.09, 890.142
See application file for complete search history.

(56) References Cited

U.S. PATENT DOCUMENTS

| | | | | |
|---|---|---|---|---|
| 8,197,029 | B2 * | 6/2012 | Debrabander | B41J 2/161 347/44 |
| 2007/0146437 | A1 | 6/2007 | Murakami et al. | |
| 2009/0147049 | A1 | 6/2009 | Lee et al. | |
| 2012/0098897 | A1 | 4/2012 | Suzuki | |
| 2013/0242000 | A1 | 9/2013 | Faralli et al. | |

FOREIGN PATENT DOCUMENTS

| | | | |
|---|---|---|---|
| WO | 03/024719 | A1 | 3/2003 |
| WO | 2005/014292 | A2 | 2/2005 |

* cited by examiner

PROCESS FOR MANUFACTURING A NOZZLE PLATE

CROSS REFERENCE TO RELATED DOCUMENTS

This application is a Division of U.S. application Ser. No. 13/891,609, filed on May 10, 2013, now abandoned, which claims priority to Italian Application No. TO2012A000426, filed on May 11, 2012.

BACKGROUND

Technical Field

The present disclosure relates to a process for manufacturing a nozzle plate and a fluid-ejection device comprising said nozzle plate.

Description of the Related Art

Devices for ejecting liquids or, in general, fluids in the form of drops (such as for example inhalers, printing heads, etc.) generally comprise a nozzle plate set facing a reservoir containing the liquid to be ejected. An actuation element, for example a piezoelectric element, can be used for deforming the reservoir and causing exit of the liquid through the nozzles of the membrane. Another known technology for ejecting liquid is thermal technology (known as thermal inkjet or bubble inkjet), where a heater, set between each nozzle and the reservoir, is configured to generate a bubble of vapor that causes ejection of liquid from the respective nozzle.

It is clear that, irrespective of the ejection technology used, the size and shape of the nozzles, as well as the uniformity of size and shape of the nozzles, are particularly important parameters for defining the size and directionality of the drops generated and their reproducibility.

Generally, the nozzles have a cylindrical shape with an outlet diameter smaller than the diameter of the channel that supplies the nozzles with the liquid to be ejected. Frequently, between the supply channel and the respective nozzle, a substantially frustoconical connection element is moreover provided having a major-base section (with a diameter equal to the diameter of the supply channel) coupled to the supply channel itself, and a minor-base section (with a diameter equal to the diameter of the base section of the nozzle) coupled to the nozzle. This configuration enables an increase in the speed of ejection the drops generated. However, the coupling step, in particular between the connection element and the nozzle, is not easy, and is frequently the cause of undesirable misalignments.

In addition, nozzles having an outlet mouth that protrudes from the nozzle plate are particularly subject to damage, and to the undesirable deposit of material that is likely to create an obstacle to ejection of the liquid. A further disadvantage of said nozzle plates is the dependence of the drop ejected upon the outer structural conformation of the nozzles.

BRIEF SUMMARY

One or more embodiments of the present disclosure are directed to providing a process for manufacturing a nozzle plate for a fluid-ejection device, a nozzle plate for a fluid-ejection device, and a fluid-ejection device that uses said nozzle plate.

BRIEF DESCRIPTION OF THE SEVERAL VIEWS OF THE DRAWINGS

For a better understanding of the present disclosure preferred embodiments thereof are now described, purely by way of non-limiting example, with reference to the attached drawings, wherein.

DETAILED DESCRIPTION

Figure 1A:
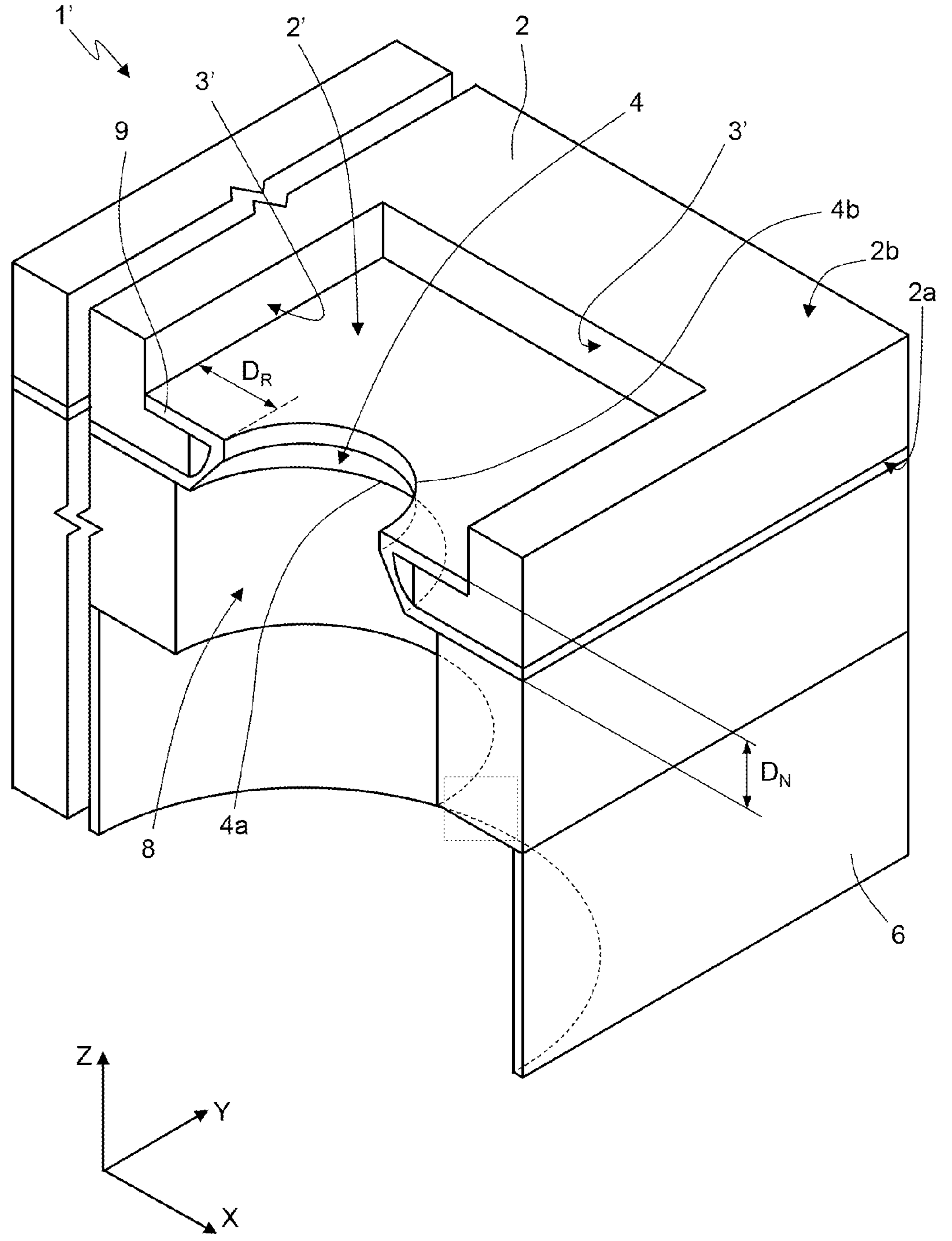
FIG. 1*a* is a sectioned perspective view of a portion of a fluid-ejection device provided with a nozzle plate including a nozzle, according to one embodiment of the present disclosure.
Figure 1B:
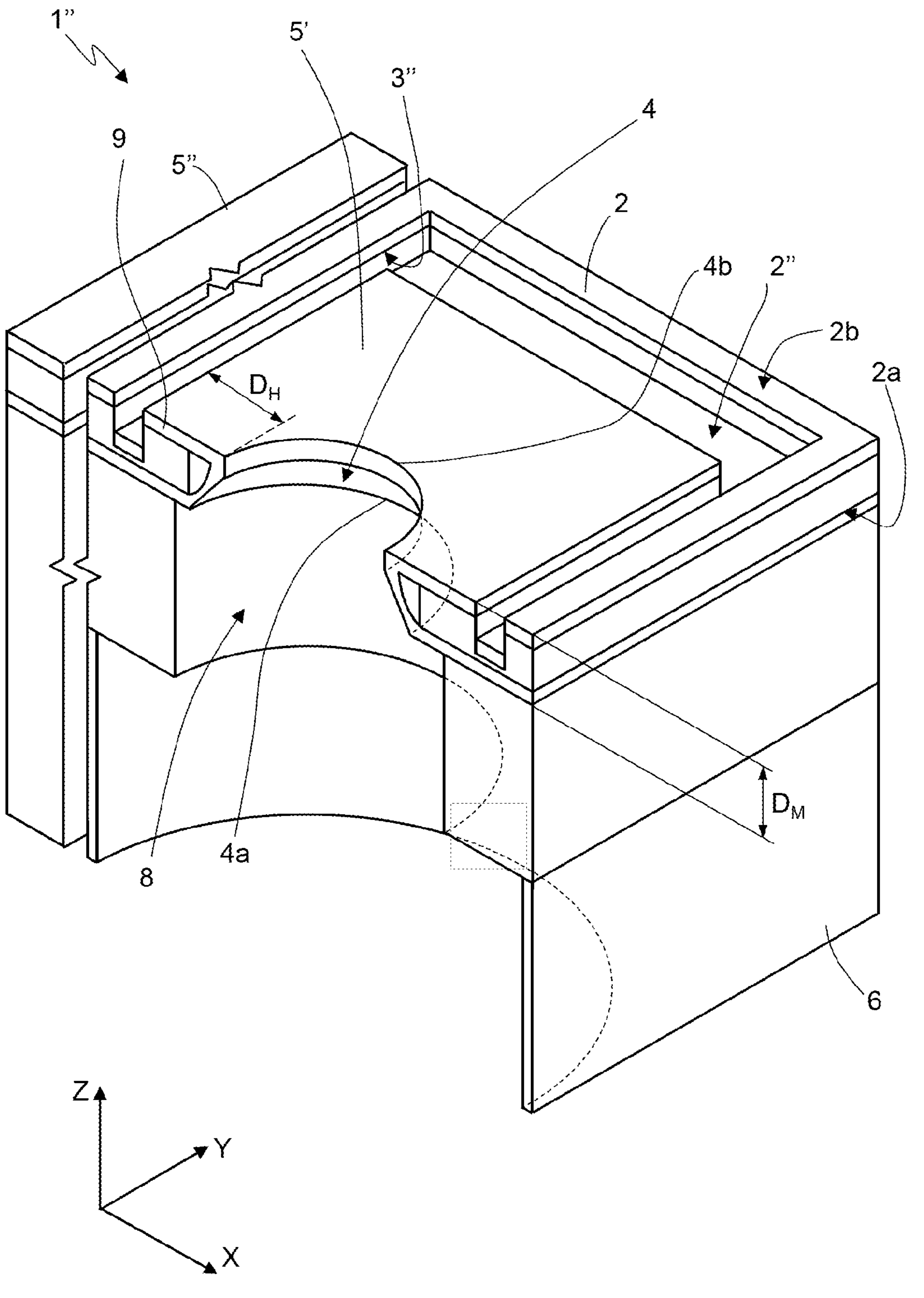
FIG. 1*b* is a sectioned perspective view of a portion of a fluid-ejection device provided with a nozzle plate including a nozzle, according to a further embodiment of the present disclosure.

FIGS. 1*a* and 1*b* show, in perspective view, a respective fluid-ejection element 1', 1" according to respective embodiments of the present disclosure. Features that are common to both of the fluid-ejection elements 1', 1" are designated in what follows by the same reference numbers.

The fluid-ejection elements 1', 1" comprise, respectively, a plate 2 provided with one or more nozzles 4 (just one nozzle 4 is illustrated in FIGS. 1*a* and 1*b*). In particular, the views of FIGS. 1*a* and 1*b* show the respective fluid-ejection element 1', 1" sectioned along a diameter of the nozzle 4, which, in this representation, has a substantially circular cross section.

The plate 2 is provided with a first side and a second side, opposite to one another in the direction Z. Set underneath the plate 2, on the second side 2*b*, is a reservoir 6, provided with an ejection channel 8 fluidically coupled to the nozzle 4. The reservoir 6 is configured to contain a liquid or fluid to be ejected through the nozzle 4. Ejection is obtained, according to one embodiment, by means of a piezoelectric element (not illustrated in FIGS. 1*a* and 1*b*), having the function of an actuator to enable ejection of the fluid through the nozzle 4. When activated by means of an appropriate control electronics (not illustrated), said piezoelectric actuator induces a vibration that is transmitted to the fluid contained in the ejection channel 8, causing exit thereof through the nozzle 4. Other types of actuators may be used, for example actuators of a thermal type, operating according to "thermal inkjet" technology.

According to the embodiment of FIG. 1*a*, the nozzle 4 is made in the form of hole that extends completely through the plate 2, in a region of the latter provided with a recess 2', formed in a position corresponding to the first side 2*a* of the plate 2.

The recess 2' can have any shape, for example a quadrangular, or polygonal shape (possibly with rounded corners), or else a circular or oval shape. An oval shape or a polygonal shape with rounded corners facilitates possible operations of cleaning of the recess 2'. According to one embodiment, the recess 2' has axial symmetry with respect to the area in which the nozzle 4 is set.

When the recess 2 has rounded corners, rounding of said corners may be obtained by means of an etching step.

The nozzle 4 forms a passage for the fluid contained in the reservoir 6 towards the outside of the fluid-ejection element 1'. An inlet section 4*a* of the nozzle 4 is fluidically coupled directly to the ejection channel 8, whereas an outlet section 4*b* of the nozzle 4 extends in an area corresponding to the recess 2'. The distance $D_N$, in the direction Z, between the inlet section 4*a* and the outlet section 4*b* corresponds to the thickness of the plate 2 (distance, along Z, between the first and second sides 2*a*, 2*b*) minus the depth of the recess 2'. As will be described in greater detail hereinafter, said distance further comprises, according to one embodiment of the present disclosure, the thickness of a protective layer designated by the reference number 9.

The outlet section 4*b* of the nozzle 4 has, in top view (i.e., viewing the nozzle 4 in the direction Z) a substantially circular shape with a diameter $d_1$. Also the inlet section 4*a* has, in top view, a substantially circular shape, but with a diameter $d_2$ larger than the diameter $d_1$. This configuration of the nozzle 4, where the inlet section 4*a* is directly coupled to the ejection channel 8 and has a diameter $d_2$ larger than the diameter $d_1$ of the outlet section 4*b*, which extends in an area corresponding to the recess 2', presents the advantage of enabling the generation, during use, of drops being ejected and having a high exit speed. In particular, the speed of said drops is greater than the one that can be obtained by means of nozzles having a substantially cylindrical shape, where the inlet section 4*a* has a diameter approximately equal to that of the outlet section 4*b*. According to one aspect of the present disclosure, the inlet section 4*a* and/or the outlet section 4*b* have rounded corners.

According to one aspect of the present disclosure, the recess 2' extends so as to surround the nozzle 4 at least partially. In this case, the nozzle 4 extends at least partially in the recess 2'. According to a further aspect of the present disclosure, the recess 2' extends so as to surround the nozzle 4 completely. In this case, the nozzle 4 extends completely in the recess 2'.

The recess 2' is delimited by walls 3' set at a distance from the nozzle 4 in such a way as to not hinder, or interfere with, ejection of the liquid during use of the fluid-ejection element 1'. For example, the walls 3' extend at a minimum distance $D_R$, measured starting from the edge of the outlet section 4*b* of the nozzle 4 up to interception of the closest point of the walls 3', between approximately 3 μm and approximately 30 μm, in particular between approximately 5 μm and approximately 20 μm, for example approximately 10 μm. The recess 2' extends in the structural layer 16 for a depth, measured starting from the first side 2*a* of the structural layer 2, between 0.1 μm and 10 μm, for example 1 μm.

According to one embodiment, the walls 3' are vertical, and extend parallel to the axis Z. According to a further embodiment, the walls 3' extend in a plane inclined with respect to the axis Z.

Moreover, the angle between the walls 3' and the surface 2*a* of the plate 2, according to one embodiment, is an angle of approximately 90°. In addition, according to one embodiment, the edge defined by the region where the walls 3' encounter the surface 2*a* of the plate 2, is rounded. This is useful when cleaning the plate 2 and the recess 2', as well as cleaning the walls 3'.

The presence of the recess 2' prevents any debris, for example deriving from the process of ejection of the fluid from the nozzle 4, and/or undesirable material with which the plate 2 might come into contact during use from possibly interfering with ejection of the fluid from the nozzle 4. In particular, if the plate 2 is set in contact with a dirty surface, since the outlet section 4*b* of the nozzle 4 is formed in the recess 2', it is not in direct contact with said dirty surface, thus reducing the possibility of obstruction of the nozzle 4.

According to one aspect of the present disclosure, the nozzle plate 2 further comprises a protective layer 9 that extends in such a way as to cover the base surface of the recess 2' and the walls of the hole that forms the nozzle 4 (i.e., the walls that connect the inlet section 4*a* with the outlet section 4*b*). The protective layer 9 is made of a material that does not undergo a significant degradation when set in (even prolonged) contact with the fluid that is to be ejected through the nozzle 4. In this way, even in the case where corrosive fluids are ejected, the nozzle does not undergo a degradation such as to jeopardize effective use thereof for the application considered. It is evident that the choice of the material used for the protective layer 9 depends upon the type of use envisaged for the fluid-ejection element 1'. For example, in the case where the fluid to be ejected is ink, materials that can be used for the protective layer 9 are, for example, silicon carbide, alumina, hafnium oxide, titanium, tantalum, tungsten, and/or alloys thereof.

In general, the protective layer 9 can have also the function of improving the resistance in regard to the operations of cleaning of the fluid-ejection element 1', improving the sturdiness thereof, modifying the properties of the recess 2' and/or of the nozzle 4 so as to render one or both of them hydrophobic or hydrophilic (according to the need), as well as other functions. Consequently, in general, the protective layer 9 has the function of modifying the surface properties of the fluid-ejection element 1' (namely, it is a surface-modification layer).

According to the embodiment of FIG. 1*b*, the nozzle 4 is provided in the form of a hole that extends completely through the plate 2, but, unlike the embodiment of FIG. 1*a*, the nozzle 4 of FIG. 1*b* does not extend inside the recess 2'.

The plate 2 comprises, in this case, a trench 2" (in what follows referred to as "recess", for consistency with the terms adopted in describing the embodiment of FIG. 1*a*) that surrounds completely, or partially, the nozzle 4; the recess 2" is separated from the outlet section 4*b* of the nozzle 4 by a portion 5' of the plate 2. Hence, the outlet section 4*b* of the nozzle 4 extends on the first side 2*a* of the plate 2. The recess 2" is delimited perimetrally by walls 3".

In other words, the recess 2" extends in the plate 2 defining a closed polygonal, or circular, or oval path. In turn, the closed polygonal path defines the portion 5' of the plate 2 internal to the closed polygonal path and, consequently, a portion 5" of the plate 2 external to the closed polygonal path. The outlet section 4*b* of the nozzle 4 is formed in an area corresponding to the portion 5' of the plate 2 internal to the closed polygonal path.

In a way similar to what has been described with reference to FIG. 1*a*, the nozzle 4 forms a passage for the fluid contained in the reservoir 6 towards the outside of the fluid-ejection element 1". The inlet section 4*a* of the nozzle 4 is fluidically coupled directly with the ejection channel 8. The distance $D_M$, in the direction Z, between the inlet section 4*a* and the outlet section 4*b* corresponds to the thickness of the plate 2 (distance, along Z, between the first and second sides 2*a*, 2*b*). According to one embodiment of the present disclosure, as illustrated more fully in what follows, said distance $D_M$ further comprises the thickness of the protective layer 9.

The outlet section 4*b* of the nozzle 4 has, in top plan view (i.e., observing the nozzle 4 in the direction Z) a substantially circular shape with diameter $d_1$. The inlet section 4*a* has also, in top plan view, a substantially circular shape, but with a diameter $d_2$ greater than $d_1$.

As has been said, the recess 2" extends at a distance from the nozzle 4, for example at a distance $D_H$, measured starting from the edge of the outlet section 4*b* of the nozzle 4 up to interception of a point belonging to the walls 3" that is closest to the edge of the outlet section 4*b* of the nozzle 4.

The distance $D_H$ is, for example, between approximately 0.5 μm and approximately 5 μm. The recess 2" extends in the structural layer 16 for a depth, measured starting from the first side 2*a* of the structural layer 2, between 0.1 μm and 10 μm, for example, equal to 1 μm.

The presence of the recess 2" that extends at the distance $D_H$ from the nozzle 4 prevents any debris, for example deriving from the process of ejection of the fluid from the nozzle 4, and/or undesirable material with which the plate 2 might come into contact in use, from possibly accumulating in the proximity of the nozzle 4, thus interfering with ejection of the fluid from the nozzle 4.

In particular, any possible debris or undesirable material may be removed, during use, by means of a simple step of cleaning of the surface of the plate 2. Alternatively, it is the ejection of fluid itself that enables displacement of any possible debris to one side of the nozzle 4. By forming the recess 2" in the proximity of the nozzle 4 and alongside it, said debris can accumulate, by displacing spontaneously (as a result of the use of the ejection element 1") or following upon the cleaning step, within the recess 2". Consequently, said debris does not remain either on the first side 2*a* of the plate 2 or in the proximity of the outlet section 4*b* of the nozzle 4.

In a way similar to what has already been described with reference to FIG. 1*a*, according to one embodiment of the present disclosure, also the nozzle plate 2 of FIG. 2*b* further comprises a protective layer 9, which extends in such a way as to cover the walls of the hole that provides the nozzle 4 (i.e., the walls that connect the inlet section 4*a* with the outlet section 4*b*). Since, according to the embodiment of FIG. 2*b*, the recess is formed at a distance from the outlet section 4*b* of the nozzle 4, the protective layer 9 extends on the first side 2*a* of the plate 2 in such a way as to surround the outlet section 4*b* of the nozzle 4, but does not extend within the recess 2".

The protective layer 9 is made of a material that does not undergo a significant degradation when it is set in (even prolonged) contact with the fluid that is to be ejected through the nozzle 4. In this way, even in the case of ejection of corrosive fluids, the nozzle does not undergo a degradation such as to jeopardize an effective use thereof for the application considered.

According to a further embodiment, the protective layer 9 extends also within the recess 2", improving the resistance to corrosion of the side walls 3" and of the bottom surface of the recess 2".

The choice of the material used for the protective layer 9 depends upon the type of use envisaged for the fluid-ejection element 1". For example, in the case where the fluid to be ejected is ink, materials that can be used for the protective layer 9 are, for example, silicon carbide, alumina, hafnium oxide, titanium, tantalum, tungsten, and/or alloys thereof.

In general, the protective layer 9 can have also the function of improving the resistance in regard to the operations of cleaning of the fluid-ejection element 1", improving the sturdiness thereof, modifying the properties of the recess 2" and/or of the nozzle 4 so as to render one or both of them hydrophobic or hydrophilic (according to the need), as well as other functions. Consequently, in general, the protective layer 9 has the function of modifying the surface properties of the fluid-ejection element 1" (namely, it is a surface-modification layer).

FIGS. 2-12 show steps for manufacturing the fluid-ejection element 1' of FIG. 1*a*.

In particular, steps of production of the nozzle plate 2 and its coupling with the channel 8 are described. The steps of production of the reservoir 6 and its coupling with the ejection channel 8 do not form the subject of the present disclosure and are consequently not described in detail in what follows.

The view of the fluid-ejection element 1' of FIGS. 2-12 corresponds to the fluid-ejection element 1' of FIG. 1*a* when viewed parallel to the direction Y, orthogonal to the plane XZ.

Figure 2:
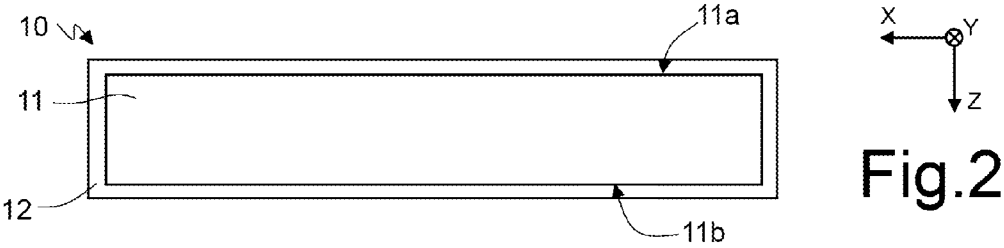
FIGS. 2-12 show, in lateral sectional view, steps for manufacturing the nozzle plate of FIG. 1*a* according to one embodiment of the present disclosure.

With reference to FIG. 2, according to one aspect of the present disclosure, a wafer 10 is provided, comprising a substrate 11 made of semiconductor material, for example silicon, having a substantially uniform thickness, comprised in the range from approximately 200 μm to approximately 800 μm, for example approximately 400 μm. The substrate 11 has a top face 11*a* and a bottom face 11*b*, opposite to one another in the direction of the axis Z.

An intermediate layer 12 is formed on the substrate 11 for protecting the substrate 11 during subsequent manufacturing steps. For example, the intermediate layer 12 is made of silicon oxide ($SiO_2$) and is formed, for instance, by means of thermal growth of $SiO_2$ on the substrate 11 when the latter is made of silicon. The intermediate layer 12 is formed both on the top face 11*a* and on the bottom face 11*b* of the substrate 11.

According to a different embodiment of the present disclosure, the intermediate layer 12 is formed only on the top face 11*a* of the substrate 11.

In any case, it is evident that the intermediate layer 12 can be formed by means of a technique different from thermal growth, for example by deposition of material such as silicon oxide or silicon nitride (SiN), or again some other material.

Irrespective of the technique used for forming the intermediate layer 12, the latter has a substantially uniform thickness, comprised in the range from approximately 0.5 μm to approximately 2 μm, for example approximately 1 μm.

Figure 3:
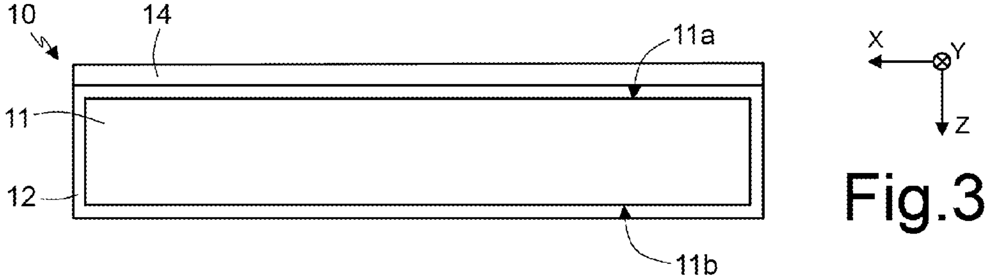

As shown in FIG. 3, a sacrificial layer 14 is formed on the top face 11*a* of the substrate 11, for example by means of a deposition technique. The sacrificial layer 14 may be made either of a material that can be etched away together with the material of which the intermediate layer 12 is formed (i.e., by means of one and the same chemical etch) or of a material that can be etched selectively with respect to the material of which the intermediate layer 12 is formed. For example, the sacrificial layer 14 is made of silicon oxide or silicon nitride, or some other material. The sacrificial layer 14 has a thickness comprised in the range from approximately 0.1 μm to approximately 10 μm, for example approximately 1 μm.

Figure 4:
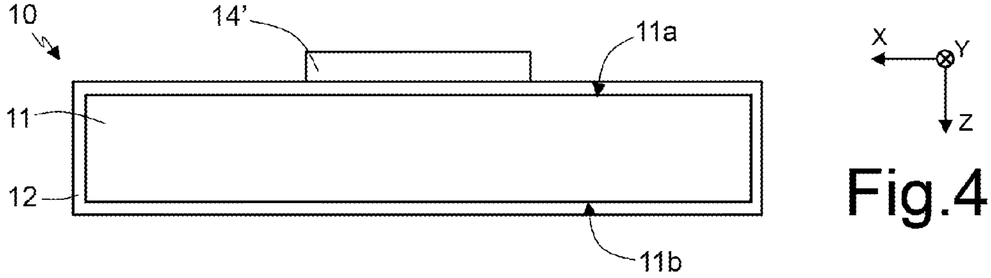

In FIG. 4, the sacrificial layer 14 is selectively etched so as to remove the sacrificial layer 14 from the wafer 10 except for regions in which it is desired to form the recess 2' illustrated in FIG. 1*a*. There is thus formed a sacrificial island 14' that extends on top of the intermediate layer 12 and of the top face 11*a* of the substrate 11.

Figure 5:
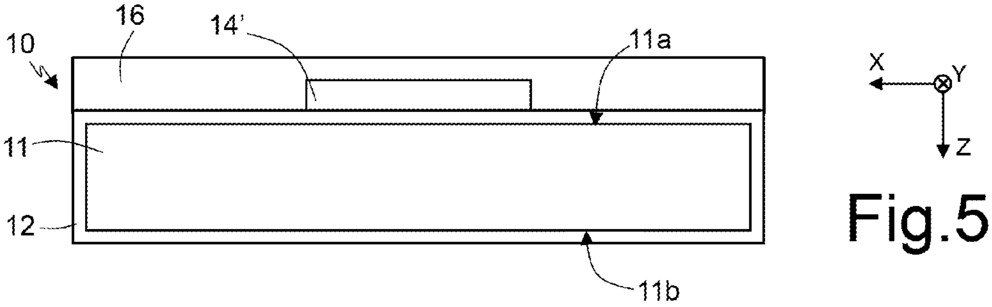

As shown in FIG. 5, a structural layer 16 is grown on the wafer 10 (on the top face 11*a* of the substrate 11, of the intermediate layer 12, and of the sacrificial island 14'), for example by means of epitaxial growth of silicon. The structural layer 16 has a substantially uniform thickness, comprised in the range from approximately 5 μm to approximately 100 μm, and preferably from approximately 10 μm to 50 μm, for example 20 μm. According to one embodiment of the present disclosure, the structural layer 16 is initially formed with a thickness larger than the desired thickness. This is followed by a planarization step so as to reach a desired thickness (uniform on the wafer 10) and at the same time reduce the surface roughness of the structural layer 16. The planarization step is carried out, for example, with the CMP (Chemical Mechanical Planarization) technique.

Figure 6A:
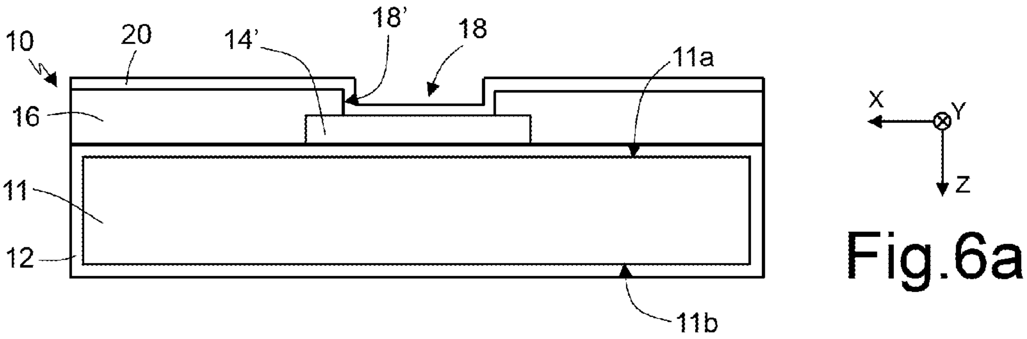
Figure 6B:
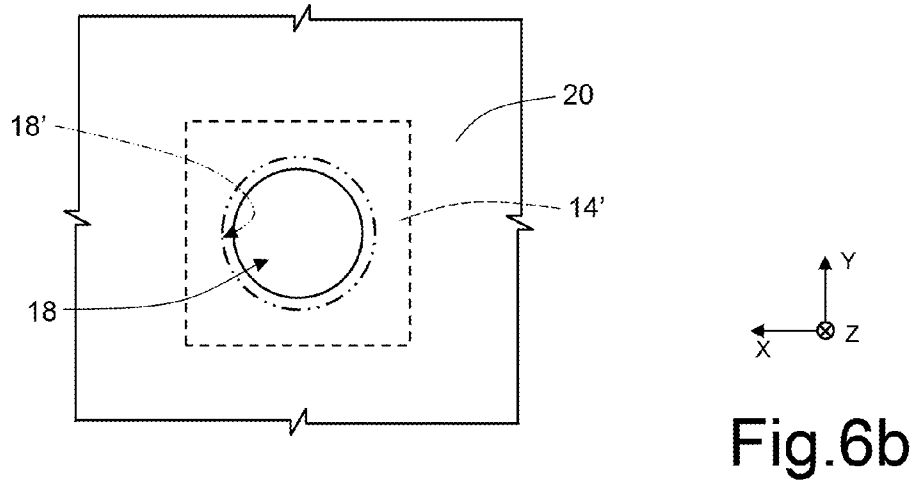

As shown in FIG. 6*a*, the structural layer 16 is etched in such a way as to define an opening 18 in a position corresponding to the sacrificial island 14'. The opening 18 concurs in forming, in subsequent manufacturing steps, the nozzle 4. As illustrated in FIG. 6*b*, the opening 18 has an extension, in top view, smaller than the extension of the sacrificial island 14' (i.e., the opening 18 is completely contained within the sacrificial island 14').

Etching of the structural layer 16 to form the opening 18 is performed, for example, using the RIE (Reactive Ion Etching) technique, and proceeds until the sacrificial island 14' is reached, which operates, in this case, as etch-stop element.

It is evident that, according to different embodiments of the present disclosure, the opening 18 can be formed using other wet or dry etching techniques.

Irrespective of the technique with which the opening 18 is formed, the latter has, according to the view of FIG. 6*b*, a substantially circular shape. In perspective view (not illustrated), the opening 18 has, according to one aspect of the present disclosure, a substantially cylindrical shape. The circular base of the opening 18 has a diameter chosen according to the need, in such a way that it is contained inside the sacrificial island 14'. For example, the diameter is between 1 μm and 40 μm, more in particular between 5 μm and 25 μm. As described more fully in what follows, on account of subsequent manufacturing steps, the diameter of the opening 18 (measured during the step of FIG. 5) is larger than the diameter of the nozzle 4 at the end of the manufacturing steps.

Once again with reference to FIGS. 6*a* and 6*b*, a narrowing layer 20 is formed on top of the structural layer 16 and within the opening 18. The narrowing layer 20 has a thickness between approximately 1 μm and approximately 5 μm, for example 2 μm, and is made of a material that can be etched selectively with respect to the material of which the sacrificial island 14' is formed. For example, in the case where the sacrificial island 14' is made of silicon oxide, the narrowing layer 20 is made of silicon nitride. Instead, in the case where the sacrificial island 14' is made of silicon nitride, the narrowing layer 20 is made of silicon oxide. Other materials can, however, be used.

The narrowing layer 20 extends, in particular, at an inner surface 18' that delimits the opening 18 laterally. Preferably, the thickness previously indicated for the narrowing layer 20 is measured on the inner surface 18' of the opening 18.

Figure 7:
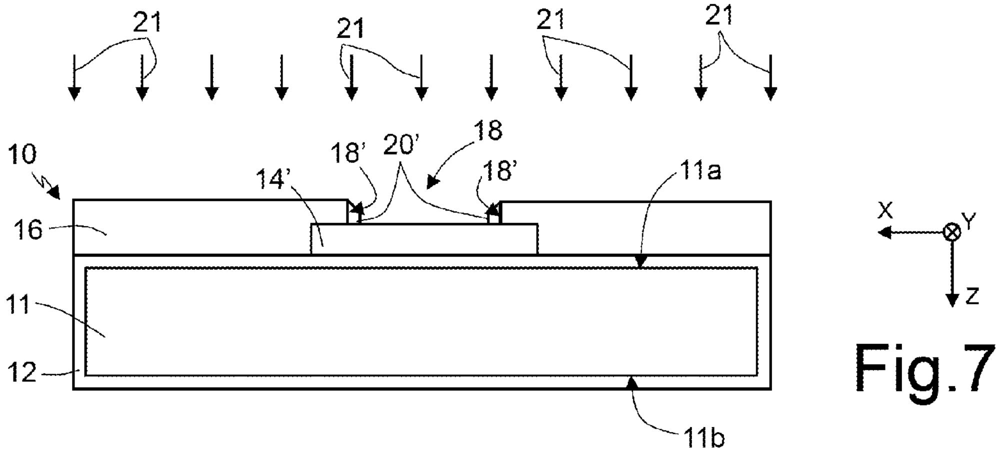

As shown in FIG. 7, the narrowing layer 20 is etched by means of directive (anisotropic) dry etching, represented in FIG. 7 by the arrows 21. In this way, portions of the narrowing layer 20 that extend orthogonal to the etching direction (i.e., portions of the narrowing layer 20 that extend parallel to the plane XY) are removed faster than portions of the narrowing layer 20 that extend parallel to the etching direction. Consequently, portions of the narrowing layer 20 that extend on top of the structural layer 16 and on top of part of the sacrificial island 14' are removed completely; instead, a portion of the narrowing layer 20 that extends along the lateral surface (inner surface) 18' of the opening 18 is not completely removed, but is shaped in such a way as to assume an at least partially tapered shape, i.e., having a non-uniform thickness $D_{SPACER}$ (measured starting from the inner surface 18'). In particular, the thickness $D_{SPACER}$ decreases moving away from the sacrificial island 14' in the direction Z. There is thus formed a narrowing element 20' extending in the opening 18 in a position corresponding, and adjacent, to the inner surface 18' of the opening 18 itself.

As may be noted from FIG. 7, the step of etching the narrowing layer 20 enables shaping, during the etching step itself, of the narrowing element 20' in the desired way, as described previously. The opening 18 thus assumes a shape that resembles, according to one embodiment, a truncated cone. In general, the narrowing element 20' is configured to shape the opening 18 in such a way that it has a cross section (parallel to the plane XY and extending in a region corresponding to the sacrificial island 14') having a diameter smaller than the diameter of the cross section of the opening 18 (also this considered parallel to the plane XY) extending in a region corresponding to the exposed surface of the structural layer 16. In general, the area of the cross section of the opening 18 extending in a region corresponding to the sacrificial island 14' is smaller than the area of the cross section extending in a region corresponding to the exposed surface of the structural layer 16. In use, at the end of the manufacturing steps, the cross section of smaller area forms the outlet section of the nozzle 4, whilst the cross section of larger area forms the inlet section of the nozzle 4.

Said narrowing element 20' has the function of forming a nozzle 4 having a tapered shape, as already illustrated in FIG. 1*a*. In particular, according to the type of etch that is used for removing the narrowing layer 20 and the duration of the etch itself, the narrowing element 20' can assume a triangular shape (in cross-sectional view) or else a shape (in cross-sectional view) given by the union of a triangular portion and a quadrangular portion, where the quadrangular portion extends as a prolongation of the triangular portion. In perspective view, this shape resembles the superposition of a frustoconical portion on a cylindrical portion. Obviously, given that the narrowing element 20' is monolithic and made of one and the same material, the two portions extend one after another with continuity, and without a clear separation. It is evident that this description of the narrowing element 20' is qualitative. Irregularities with respect to the ideal geometrical shape described, due to the manufacturing process, are possible.

Figure 8:
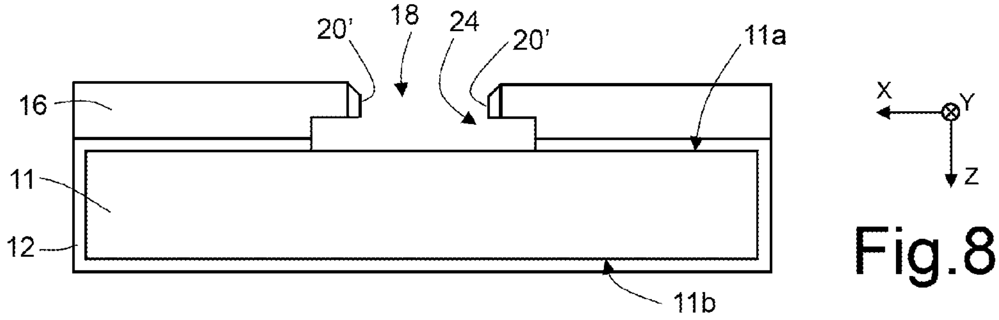

As shown in FIG. 8, the sacrificial island 14' is removed by means of wet etching. During this etching step, also the portion of the intermediate layer 12 that extends underneath the sacrificial island 14' as far as the substrate 11 is removed. A cavity 24 is thus formed, which extends underneath the narrowing element 20' and partially underneath the structural layer 16. In other words, the cavity 24 extends between the substrate 11 and the narrowing element 20', and between the substrate 11 and part of the structural layer 16.

In the case where the sacrificial island 14' and the intermediate layer 12 are made of materials that cannot be removed with one and the same chemical etch, two subsequent etches are necessary, for removing the sacrificial island 14' and the portion of intermediate layer 12 lying underneath the latter.

Figure 9:
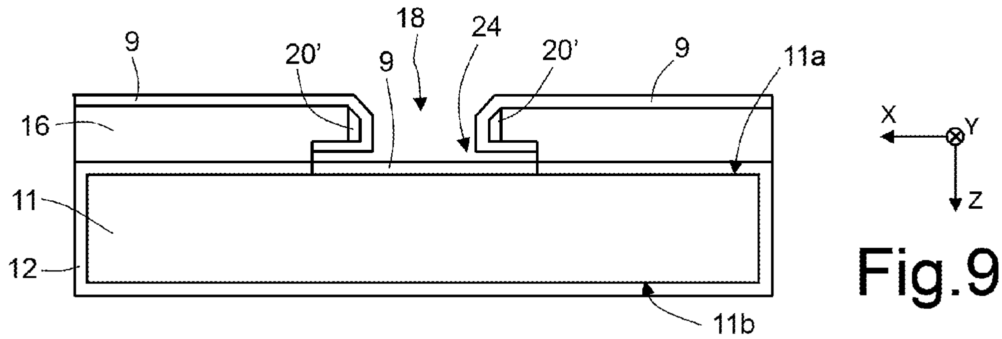

As shown in FIG. 9, the protective layer 9 is formed, which extends on the structural layer 16 and of the narrowing element 20' and on the walls that delimit the cavity 24. In particular, the protective layer 9 extends on the bottom of the cavity 24 (corresponding to the top face 11*a* of the substrate 11 exposed during the steps of FIG. 8) and on the portions of the structural layer 16 and of the narrowing element 20' directly facing the cavity 24.

According to one embodiment of the present disclosure, the protective layer 9 is deposited using the atomic layer deposition (ALD) technique, depositing a material chosen from among silicon carbide, alumina, hafnium oxide, titanium, tantalum, tungsten, and/or alloys thereof.

The protective layer 9 deposited with the ALD technique (the so-called "conformal film") has a controlled thickness over the entire surface of the nozzle 4. The ALD technique enables formation of the protective layer 9 also within the cavity 24, on the surface 11*a* of the substrate 11, the structural layer 16, and the narrowing element 20'.

The present applicant has found that, with the ALD technique, a good covering of all the walls of the cavity 24 that is formed following upon removal of the sacrificial island 14' is obtained, also in remote portions of the latter.

According to one embodiment, the protective layer 9 is deposited with the etch-assisted HDP technique, which enables a deposited protective layer to be obtained characterized by rounded corners.

Other CVD techniques can, however, be used. However, CVD techniques different from the ALD technique might not guarantee an optimal covering of the walls of the cavity 24 in remote portions thereof.

Figure 10:
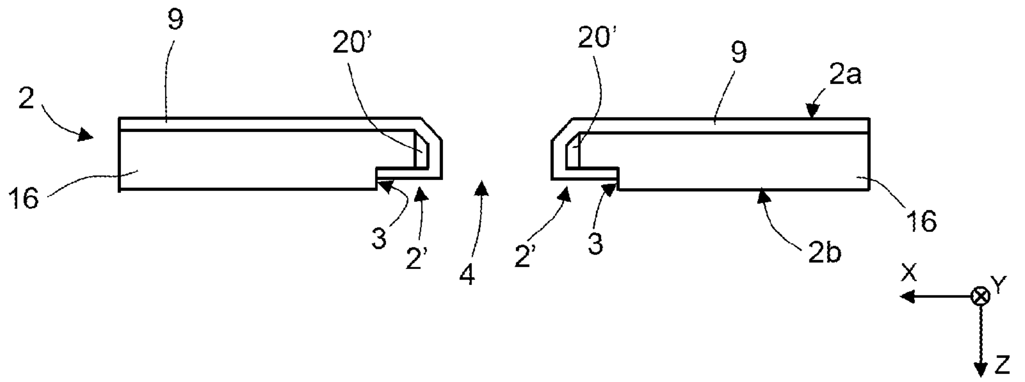

As shown in FIG. 10, a grinding step, in a region corresponding to the bottom face 11*b* of the substrate 11, enables complete removal of the intermediate layer 12 that extends on the bottom face 11*b* of the substrate 11, of the substrate 11, and of the portion of protective layer 9 formed on the top face 11*a* of the substrate 11, so as to reach the structural layer 16. The plate 2 is thus formed comprising a nozzle 4, as described with reference to FIG. 1*a*. The plate 2 has a first side 2*a* covered by the protective layer 9 and a second side 2*b* that has the recess 2' and the nozzle 4.

Figure 11A:
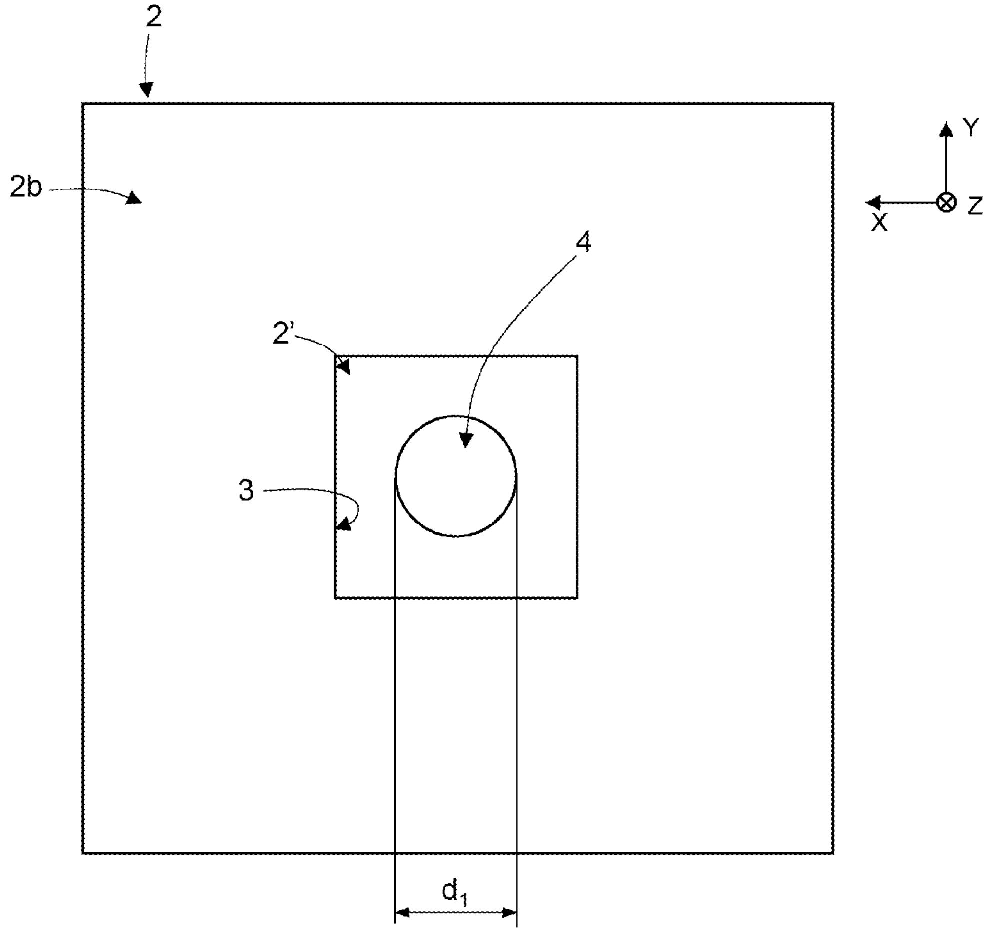

FIG. 11*a* shows, in top view, when viewed from the second side 2*b*, the nozzle 4. As may be seen, the nozzle 4 has, in top view and in an area corresponding to the recess 2', a substantially circular shape and has a diameter having a first value $d_1$. The portion of the nozzle 4 in the region of the recess 2' is the section of the nozzle 4 from which there occurs, in use, ejection of the fluid.

It is evident that, according to further embodiments (not illustrated), the nozzle 4 can have, in top view and in an area corresponding to the recess 2', an elliptical, quadrangular, polygonal shape, or an irregular shape, or any other shape deemed advantageous for the application envisaged for the nozzle 4.

Figure 11B:
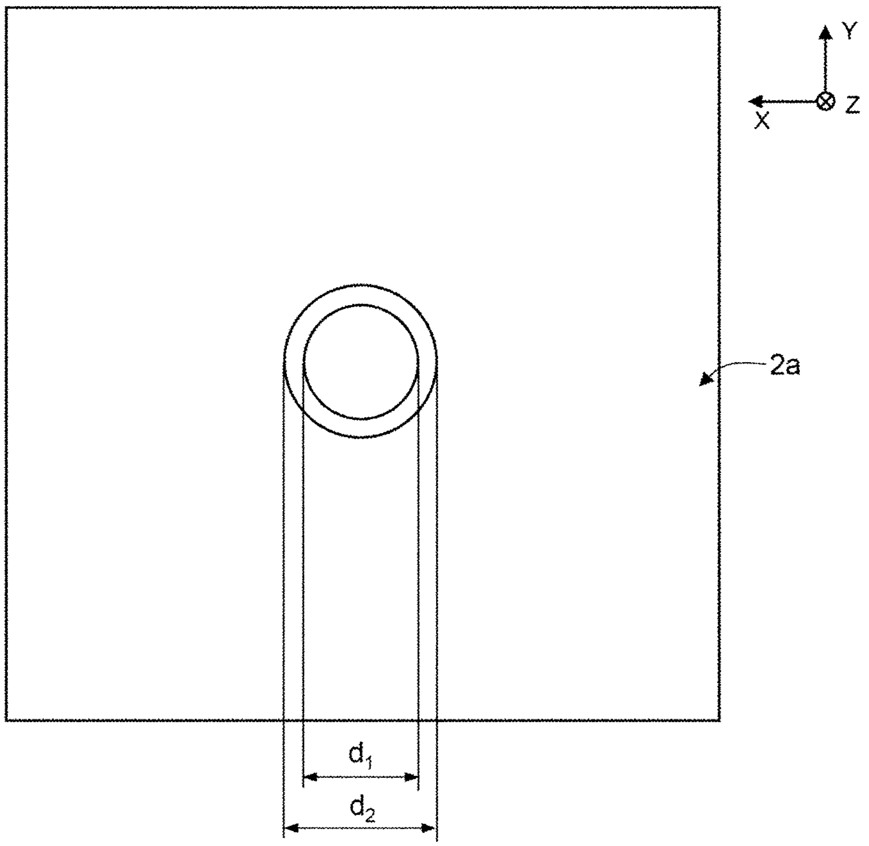

FIG. 11*b* shows, in top view when viewed from the first side 2*a*, the nozzle 4. Also in a region corresponding to the first side 2*a*, the nozzle 4 has a substantially circular shape, but in this case has a diameter having a second value $d_2$ larger than the first value $d_1$. The portion of the nozzle 4, in the region of the first side 2*a*, is the cross section of the nozzle 4 directly facing the ejection channel 8, from which the fluid to be ejected is supplied.

Hence, to return to the cross-sectional view of FIG. 10, the nozzle 4 has a tapered region configured to operate as join between the ejection channel 8 and the outlet section of the nozzle 4. The cross section of the tapered region having a larger diameter $d_2$ is configured to face directly the ejection channel 8, fluidically coupled to the latter.

The ejection channel 8 is formed starting from a substrate 30 made of semiconductor material, for example silicon, processed using micromachining techniques of a known type (lithography and etching) in such a way as to form a substantially cylindrical channel 31 having a diameter $d_C$ of a base section larger than the diameter $d_2$ (and consequently also than the diameter $d_1$) of the nozzle 4.

Figure 12:
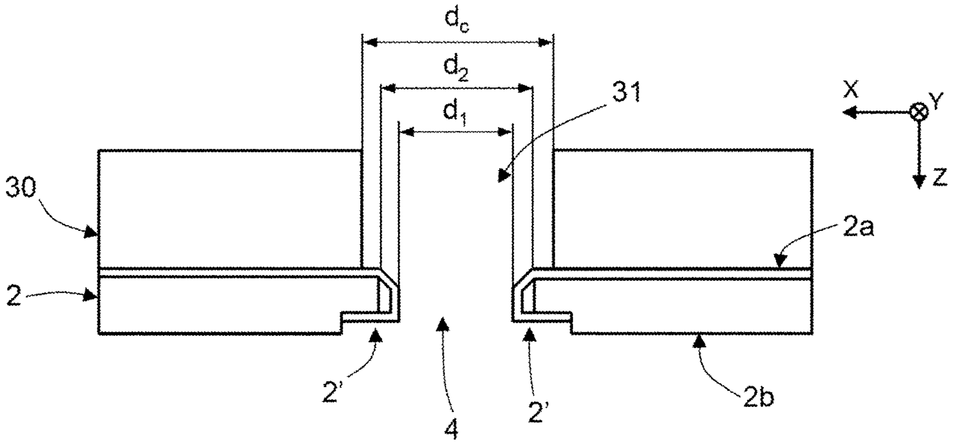

With reference to FIG. 12, the substrate 30 is coupled to the first side 2*a* of the plate 2 according to the known art, for example via wafer-to-wafer bonding, or by means of glue, or with a biadhesive layer, or in some other way. Coupling of the substrate 30 with the plate 2 is performed in such a way that the straight line, parallel to the axis Z, passing through the center of the nozzle 4, coincides with the straight line, parallel to the axis Z, passing through the center of the ejection channel 8.

According to one embodiment of the present disclosure, to facilitate the grinding operation described with reference to step 10, the step of coupling the substrate 30 to the plate 2 is carried out prior to the step of grinding the substrate 11. In this way, during the grinding operation, the substrate 30 has the function of reinforcing the plate 2 and facilitating handling thereof.

FIGS. 13-19 show steps for manufacturing a fluid-ejection element 100 according to a further embodiment of the present disclosure.

Figure 13:
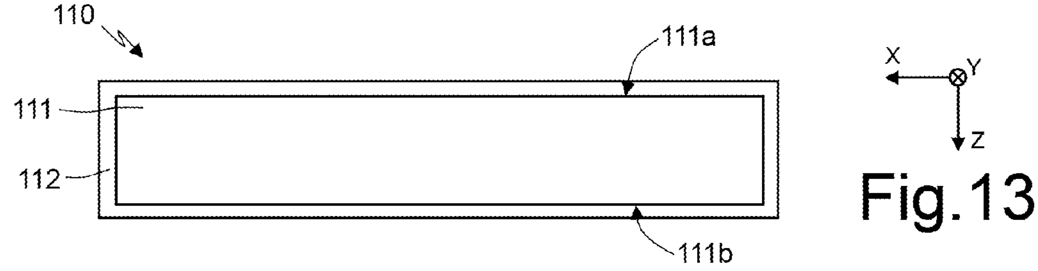
FIGS. 13-19 show, in lateral sectional view, steps for manufacturing the nozzle plate of FIG. 1*a* according to a further embodiment of the present disclosure.

With reference to FIG. 13, provided in a way similar to what has already been described with reference to FIG. 2 for the respective embodiment, is a wafer 100, comprising a substrate 110 made of semiconductor material, for example silicon, having a substantially uniform thickness, comprised in the range from approximately 200 μm to approximately 800 μm, for example approximately 400 μm. The substrate 110 has a top face 110*a* and a bottom face 110*b*, opposite to one another in the direction of the axis Z.

Formed on the substrate 110 is an intermediate layer 112 for protecting the substrate 110 during subsequent manufacturing steps. For example, the intermediate layer 112 is made of silicon oxide ($SiO_2$) and is formed by thermal growth of $SiO_2$ on the silicon substrate 110. The intermediate layer 112 is, in particular, formed both on the top face 110*a* and on the bottom face 110*b* of the substrate 110. It is evident that the intermediate layer 112 may be formed only on the top face 110*a* of the substrate 110.

In any case, it is evident that the intermediate layer 112 can be formed using a technique different from thermal growth, for example by deposition. Furthermore, the intermediate layer 112 may be made of a material other than $SiO_2$, for example silicon nitride (SiN), or some other material.

Irrespective of the technique used for forming the intermediate layer 112, the latter has a substantially uniform thickness, comprised in the range from approximately 0.1 μm to approximately 10 μm, for example approximately 1 μm.

Figure 14:
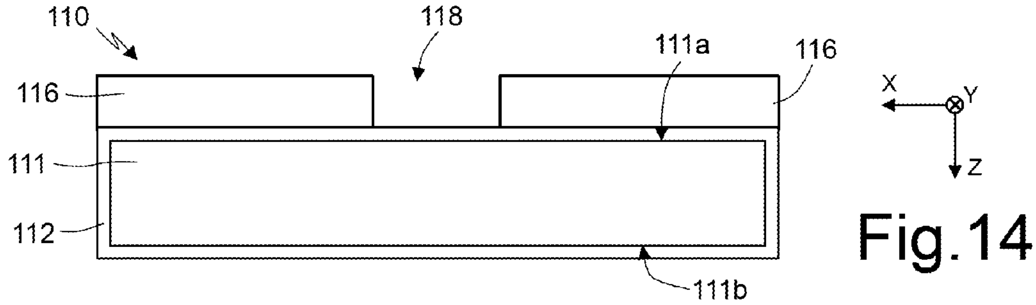

As shown in FIG. 14, on the top face 111*a* of the substrate 111 and of the intermediate layer 112 a structural layer 116 is formed, for example by epitaxial growth of silicon. The structural layer 116 has substantially uniform thickness, comprised in the range from approximately 5 μm to approximately 100 μm, and preferably from approximately 10 μm to 50 μm, for example 20 μm. The structural layer 116 is etched in such a way as to define an opening 118 that extends completely through the structural layer 116 as far as the intermediate layer 112.

The location on the wafer 100 and the shape of the opening 118 correspond to the ones already described with reference to FIGS. 6*a* and 6*b* of the respective embodiment. In this case, however, the sacrificial island 14' is not present.

Figure 15:
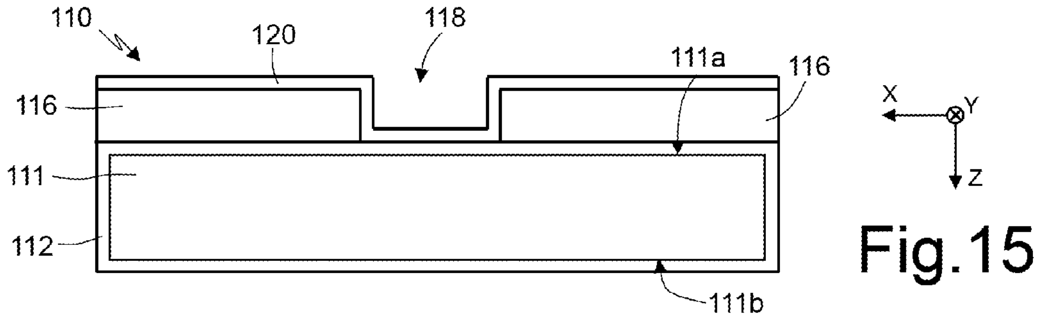

As shown in FIG. 15, formed on top of the structural layer 116 and within the opening 118 is a narrowing layer (or spacer) 120. The narrowing layer 120 has a thickness between approximately 1 μm and approximately 5 μm, for example 2 μm, and is made of a material that can be etched selectively with respect to the material of which the intermediate layer 112 is formed. For example, in the case where the intermediate layer 112 is made of silicon oxide, the narrowing layer 120 is made of silicon nitride. Instead, in the case where the intermediate layer 112 is made of silicon nitride, the narrowing layer 120 is made of silicon oxide. Other materials can, however, be used.

The narrowing layer 120 extends, in particular, on the inner surface 118' that delimits the opening 118 laterally. Preferably, the thickness previously indicated for the narrowing layer 120 is measured in an area corresponding to the inner surface 118' of the opening 118.

Figure 16:
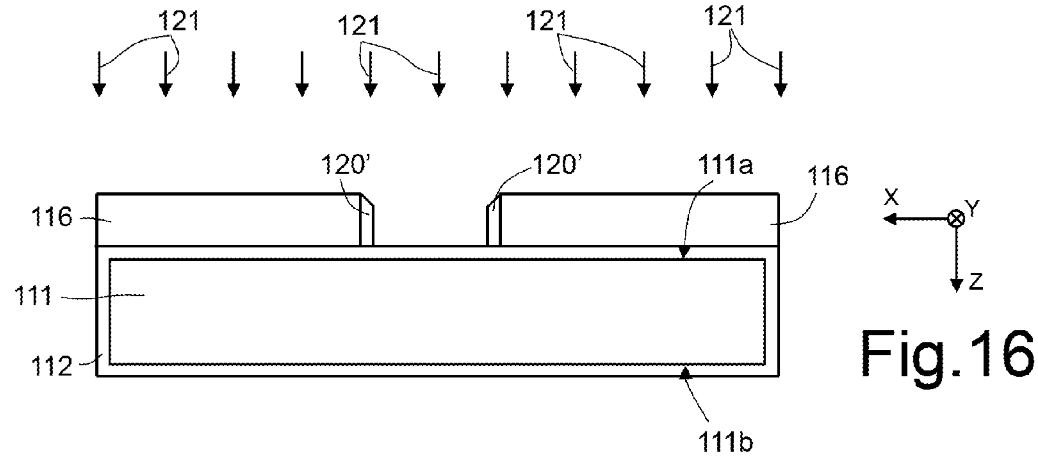

As shown in FIG. 16, the narrowing layer 120 is etched by directive (anisotropic) dry etching, indicated by the arrows 121 in FIG. 16. In this way, portions of the narrowing layer 120 that extend orthogonal to the etching direction (i.e., portions of the narrowing layer 120 that extend parallel to the plane XY) are removed faster than portions of the narrowing layer 120 that extend parallel to the etching direction. Consequently, portions of the narrowing layer 120 extending over the structural layer 116 and the intermediate layer 112 are removed completely; instead, portions of the narrowing layer 120 extending along lateral surfaces 118' of the opening 118 are not substantially etched. There is thus formed a narrowing element 120' extending in the opening 118 on the lateral surfaces 118' thereof. As may be noted from FIG. 16 (and as already described with reference to FIG. 7), the step of etching the narrowing layer 120 shapes the narrowing element 120', in particular at their top ends where the opening 118 assumes a substantially frustoconical shape.

Figure 17:
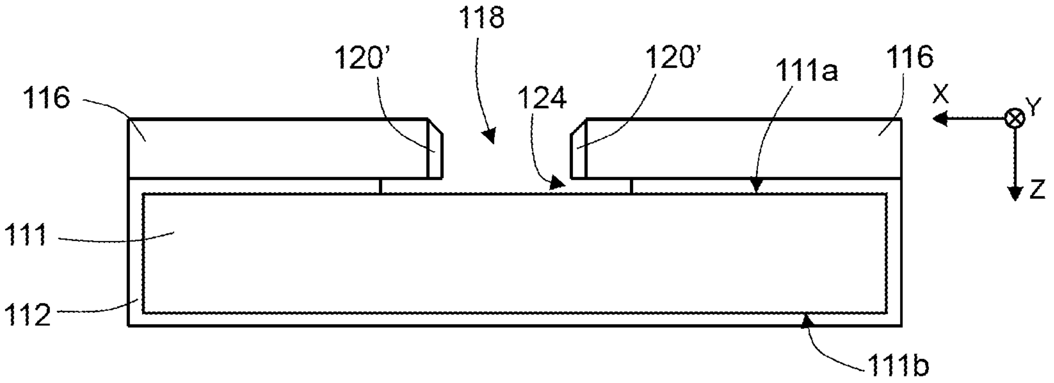

As shown in FIG. 17, an etching step is performed for removing the portion of the intermediate layer 112 exposed through the opening 118. In particular, this etching step proceeds until also a portion of the intermediate layer 112 that extends between the intermediate layer 112 and the structural layer 116 is removed. In this way, the narrowing element 120' and part of the structural layer 116 are partially suspended over the substrate 111.

Etching of the intermediate layer 112 according to the step of FIG. 17 is an etching of an isotropic type (wet etching or dry etching).

According to a further embodiment, the narrowing element 120' is made of the same material of which the intermediate layer 112 is formed (for example, silicon oxide). In this case, the etching step according to FIG. 17 removes also part of the narrowing element 120'. However, by forming narrowing elements or spacers 120' of appropriate thickness, it is possible to overcome this problem.

Figure 18:
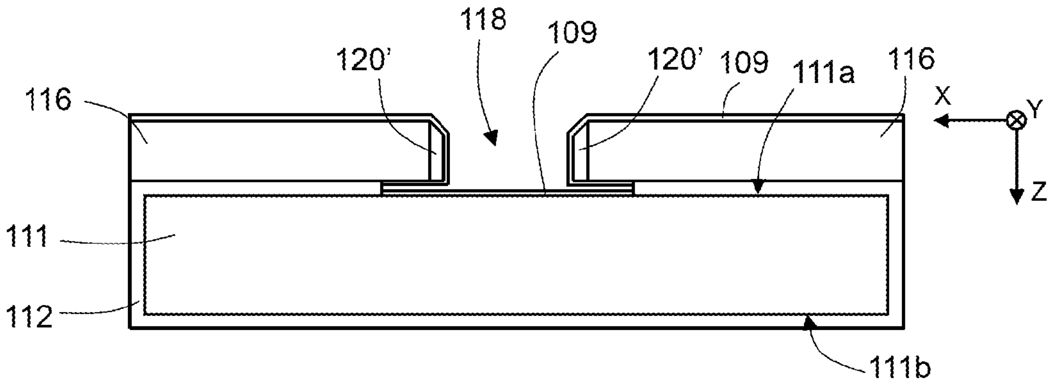

As shown in FIG. 18, a protective layer 109 is formed, that extend on top of the structural layer 116 and of the narrowing element 120'. In particular, the protective layer 109 extends also over the top face 111*a* of the substrate 111 exposed during the step of FIG. 17, and on the portions of the structural layer 116 and of the narrowing element 120' facing the top face 111*a* of the substrate 111.

The protective layer 109 is similar to the protective layer 9 already described with reference to FIGS. 1*a* and 9 and is formed in the same way.

Figure 19:
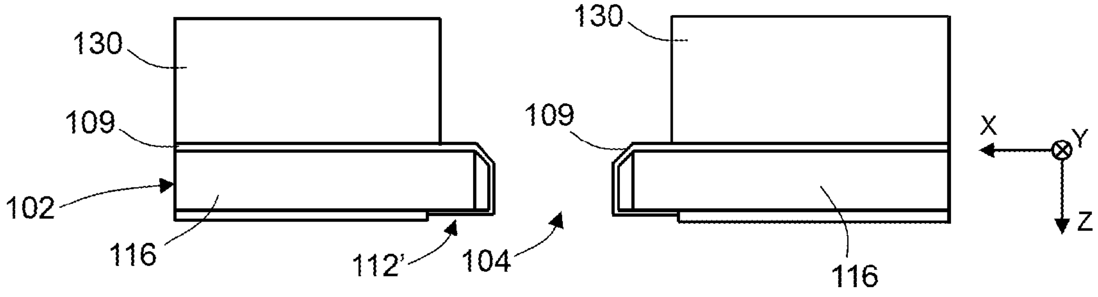

As shown in FIG. 19, a grinding step on the bottom face 111*b* of the substrate 111 enables a complete removal of the intermediate layer 112 that extends on the bottom face 111*b* of the substrate 111, of the substrate 111, and of the portion of protective layer 109 extending directly in contact with the top face 111*a* of the substrate 111. By stopping the grinding step in this stage, there remains a portion of the intermediate layer 112 surrounding the nozzle 104 such as to form a recess 112' in the intermediate layer 112. The recess 112' has, in use, the same function as the recess 2' of FIG. 1*a*.

Alternatively, it is possible to stop the grinding operation at the end of removal of the portion of the protective layer 109 extending directly on the top face 11*a* of the substrate 11, and remove the remaining intermediate layer 112 by means of a selective etching step, for example a wet etch. A step of dry etching of the protective layer 109 is performed so as to remove the protective layer 109 around the nozzle 104 only partially in order to form a recess similar to the recess 2' of FIG. 1*a*.

Irrespective of the embodiment, a plate 102 is formed comprising a nozzle 104 that is similar to the plate 2 comprising the nozzle 4 described with reference to FIG. 1*a* and illustrated in said figure. The plate 102 has a first side 102*a* covered with the protective layer 109 and a second side 102*b* that has the recess 112'.

The plate 102 is coupled to a substrate 130 similar to the substrate 30 described with reference to FIG. 12 so as to couple the nozzle 104 fluidically to an ejection channel.

FIGS. 20-27 show steps for manufacturing the fluid-ejection element 1" of FIG. 1*b*.

In particular, steps for manufacturing the nozzle plate 2 and for its coupling with the channel 8 are now described. The steps for obtaining the reservoir 6 and for its coupling with the ejection channel 8 do not form the subject of the present disclosure and are consequently not described in detail in what follows.

The view of the fluid-ejection element 1" of FIGS. 20-27 corresponds to the fluid-ejection element 1" of FIG. 1*b* when observed parallel to the direction Y, in a direction orthogonal to the plane XZ.

Figure 20:
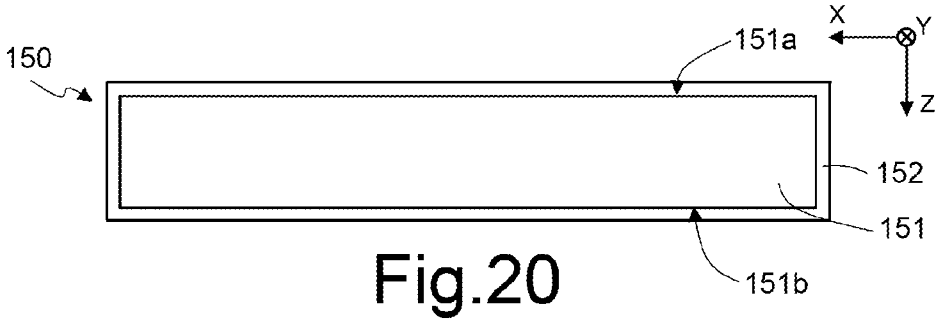
FIGS. 20-27 show, in lateral sectional view, steps for manufacturing the nozzle plate of FIG. 1*b* according to one embodiment of the present disclosure.

With reference to FIG. 20, according to one aspect of the present disclosure, a wafer 150 is provided, comprising a substrate 151 made of semiconductor material, for example silicon, having a substantially uniform thickness, ranging from approximately 200 μm to approximately 800 μm, for example of approximately 400 μm. The substrate 151 has a top face 151*a* and a bottom face 151*b*, opposite to one another in the direction of the axis Z.

Formed on the substrate 151 is an intermediate layer 152 for protection of the substrate 151 during subsequent manufacturing steps. For example, the intermediate layer 152 is made of silicon oxide ($SiO_2$) and is formed, for example, by thermal growth of $SiO_2$ on the substrate 151 when the latter is made of silicon. The intermediate layer 152 is, in particular, formed both on the top face 151*a* and on the bottom face 151*b* of the substrate 151.

According to a different embodiment of the present disclosure, the intermediate layer 152 is formed only at the top face 151*a* of the substrate 151.

In any case, it is evident that the intermediate layer 152 may be formed using a technique other than thermal growth, for example by deposition of material such as silicon oxide or silicon nitride (SiN), or some other material still.

Irrespective of the technique used to form the intermediate layer 152, the latter has a substantially uniform thickness, ranging from approximately 0.5 μm to approximately 2 μm, for example of approximately 1 μm.

Figure 21:
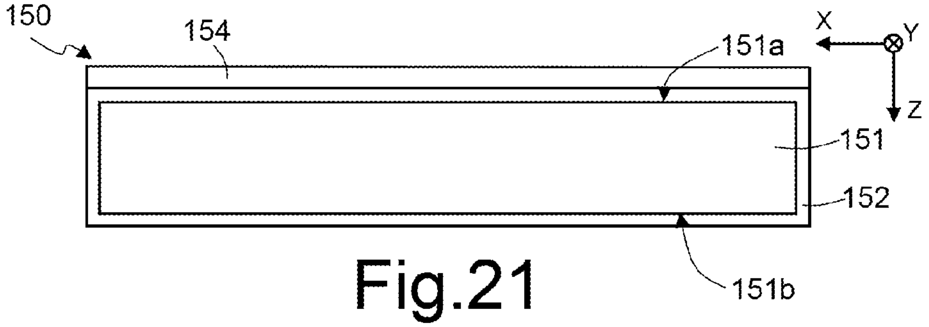

As shown in FIG. 21, formed on the top face 151*a* of the substrate 151 is a sacrificial layer 154, for example using the deposition technique. The sacrificial layer 154 may be either a material that can be etched together with the material of the intermediate layer 152 (i.e., using one and the same chemical etch) or a material that can be etched selectively with respect to the material of the intermediate layer 152. For example, the sacrificial layer 154 is made of silicon oxide or silicon nitride, or of some other material still. The sacrificial layer 154 has a thickness ranging from approximately 0.1 μm to approximately 10 μm, for example of approximately 1 μm.

Figure 22A:
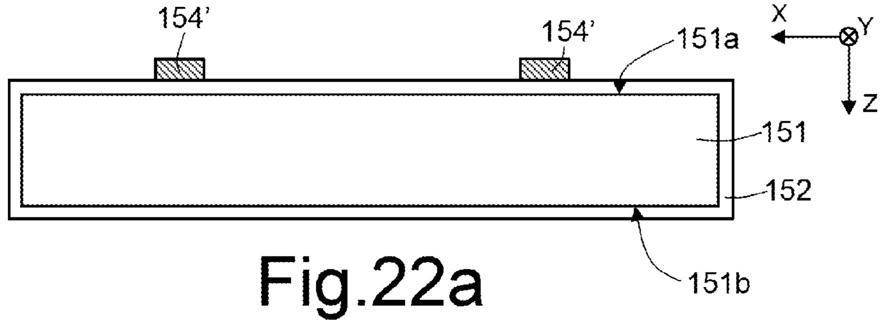
Figure 22B:
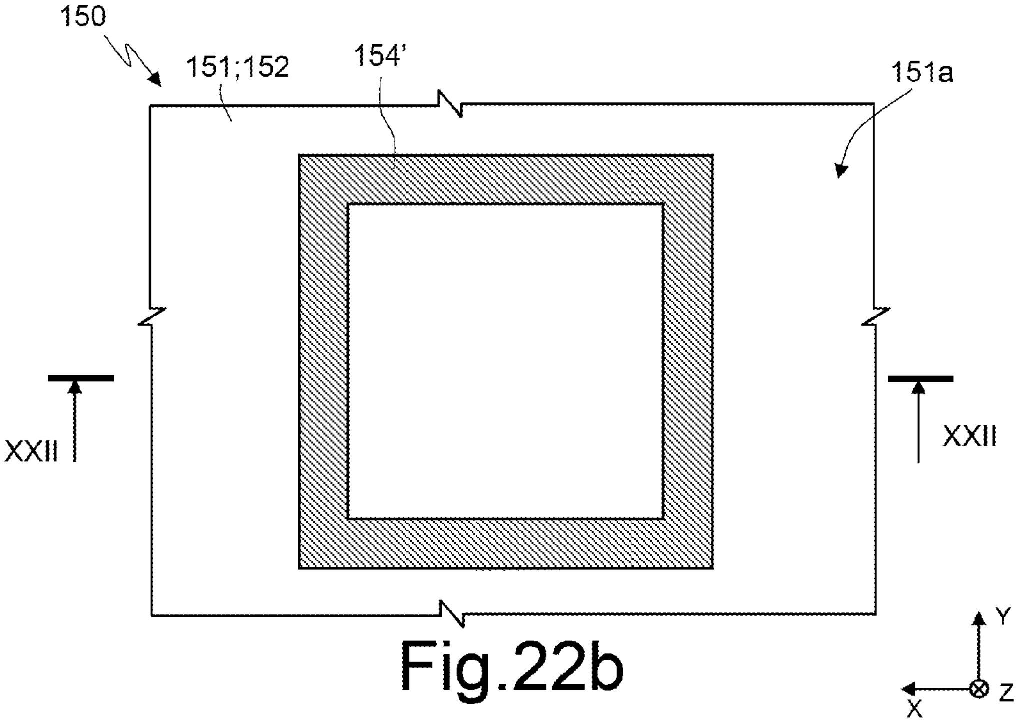

In FIG. 22*a*, the sacrificial layer 154 is selectively etched so as to remove the sacrificial layer 154 from the wafer 150 except for regions in which the recess 2" shown in FIG. 1*b* is to be formed. A sacrificial region 154' is thus formed, which extends over the intermediate layer 152 and the top face 151*a* of the substrate 151. The sacrificial region 154' has, in the top plan view of FIG. 22*b*, a polygonal shape, and forms a frame that surrounds the region of the wafer 150 in which, in subsequent manufacturing steps, the nozzle 4 will be formed.

Figure 23:
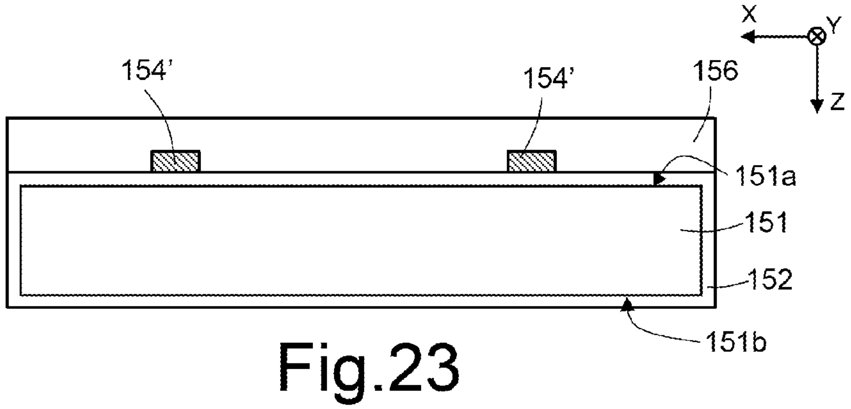

As shown in FIG. 23, a structural layer 156 is grown on the wafer 150 (on the top face 151*a* of the substrate 151, on the intermediate layer 152, and on the sacrificial region 154'), for example by epitaxial growth of silicon. The structural layer 156 has a substantially uniform thickness, ranging from approximately 5 μm to approximately 100 μm, and preferably from approximately 10 μm to 50 μm, for example of 20 μm. According to one embodiment of the present disclosure, the structural layer 156 is initially formed with a thickness greater than the desired thickness. A planarization step is carried out so as to reach a desired thickness (which is uniform on the wafer 150) and at the same time reduce the surface roughness of the structural layer 156. The planarization step is carried out, for example, with the CMP (Chemical Mechanical Planarization) technique.

Figure 24A:
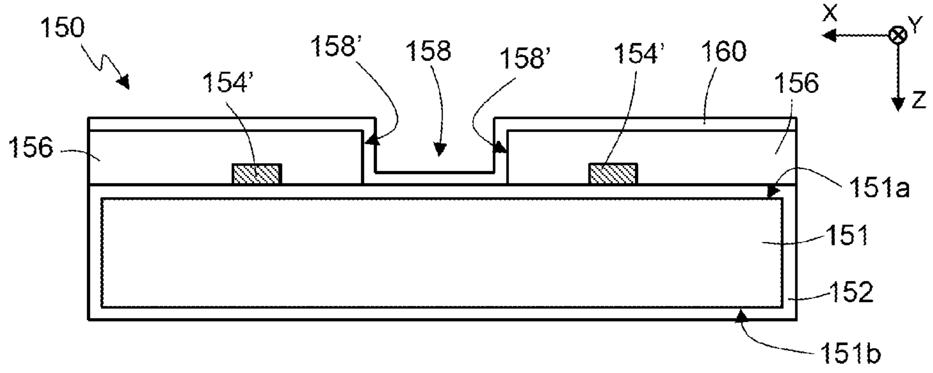
Figure 24B:
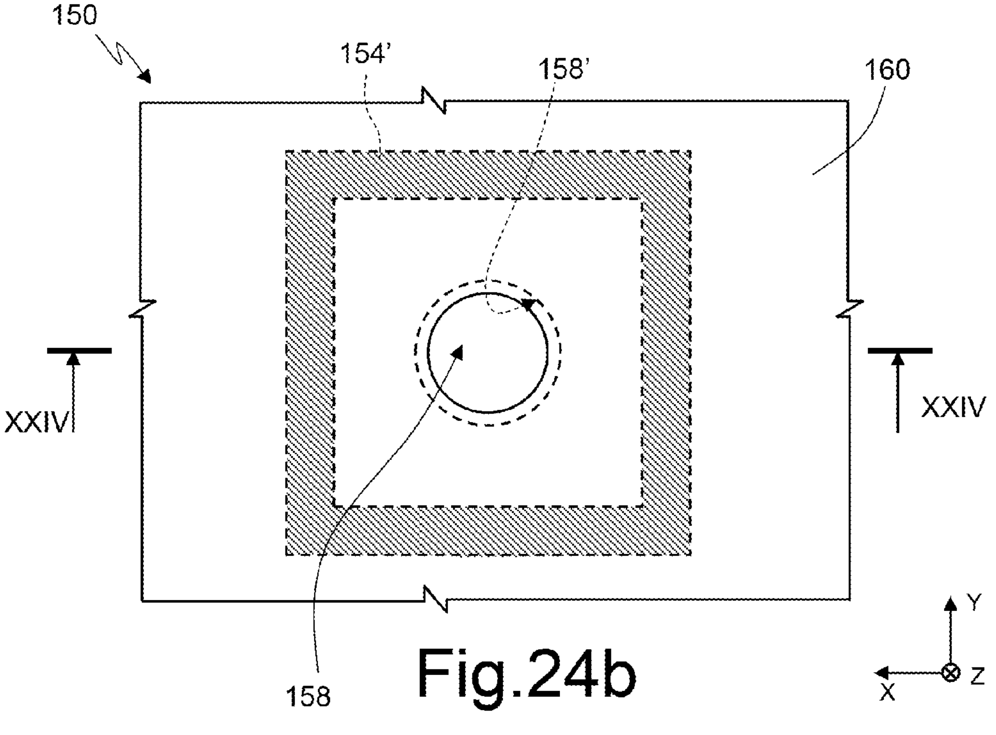

As shown in FIGS. 24*a* and 24*b*, the structural layer 156 is etched in such a way as to define an opening 158 surrounded by the sacrificial region 154'. The opening 158 concurs in forming the nozzle 4, in subsequent manufacturing steps. FIG. 24*a* is a cross-sectional view of FIG. 24*b*, taken along the line of cross section XXIV-XXIV of FIG. 24*b*.

Etching of the structural layer 156 to form the opening 158 is carried out, for example, with the RIE (Reactive Ion Etching) technique, and proceeds for the entire thickness of the structural layer 156.

It is evident that, according to different embodiments of the present disclosure, the opening 158 can be formed using other wet-etching or dry-etching techniques.

Irrespective of the technique with which the opening 158 is formed, the latter has, according to the view of FIG. 24*b*, a substantially circular shape. In perspective view (not illustrated), the opening 158 has, according to one aspect of the present disclosure, a substantially cylindrical shape. The circular base of the opening 158 has a diameter chosen according to the need, in such a way that it is contained inside the sacrificial island 154'. For example, the diameter is between 1 μm and 40 μm, more in particular between 5 μm and 25 μm. As described more fully in what follows, on account of subsequent manufacturing steps, the diameter of the opening 158 in this process step is larger than the diameter of the nozzle 4 at the end of the manufacturing steps here described.

Once again with reference to FIGS. 24*a* and 24*b*, a narrowing layer 160 is formed on top of the structural layer 156 and within the opening 158. The narrowing layer 160 has a thickness between approximately 1 μm and approximately 5 μm, for example 2 μm, and is made, for example, of silicon oxide or silicon nitride. Other materials may, however, be used.

The narrowing layer 160 extends, in particular, at an inner surface 158' that delimits the opening 158 laterally. Preferably, the thickness previously indicated for the narrowing layer 160 is measured on the inner surface 158' of the opening 158.

Figure 25:
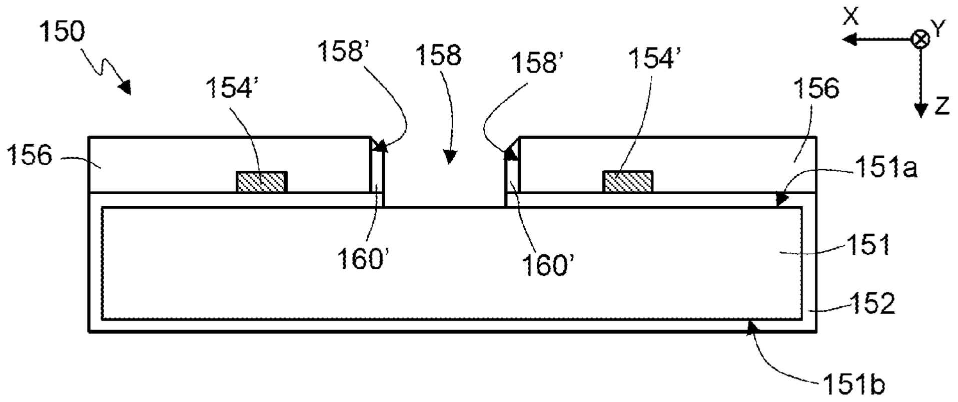

As shown in FIG. 25, the narrowing layer 160 is etched by means of directive (anisotropic) dry etching. In this way, portions of the narrowing layer 160 that extend orthogonal to the etching direction (i.e., portions of the narrowing layer 160 that extend parallel to the plane XY) are removed faster than portions of the narrowing layer 160 that extend parallel to the etching direction. Consequently, portions of the narrowing layer 160 that extend on top of the structural layer 156 and on top of the intermediate layer 152 are removed completely; instead, a portion of the narrowing layer 160 that extends along the lateral surface (inner surface) 158' of the opening 158 is not completely removed, but is shaped in such a way as to assume an at least partially tapered shape, i.e., having a non-uniform thickness $D_{SPACER}$ (measured starting from the inner surface 158'). In particular, the thickness $D_{SPACER}$ decreases moving away from the intermediate layer 152 in the direction Z. There is thus formed a narrowing element 160' extending in the opening 158 in a position corresponding, and adjacent, to the inner surface 158' of the opening 158 itself.

As may be noted from FIG. 25, the step of etching the narrowing layer 160 enables shaping, during the etching step itself, of the narrowing element 160' in the desired way, as described previously. The opening 158 thus assumes a shape that resembles, according to one embodiment, a truncated cone. In general, the narrowing element 160' is configured to shape the opening 158 in such a way that it has a cross section (parallel to the plane XY and extending in a region corresponding to the intermediate layer 152) having a diameter smaller than the diameter of the cross section of the opening 158 (also this considered parallel to the plane XY) extending in a region corresponding to the exposed surface of the structural layer 16. In general, the area of the cross section of the opening 158 extending in a region corresponding to the intermediate layer 152 is smaller than the area of the cross section extending in a region corresponding to the exposed surface of the structural layer 16. In use, at the end of the manufacturing steps, the cross section of smaller area forms the outlet section of the nozzle 4, whilst the cross section of larger area forms the inlet section of the nozzle 4.

The narrowing element 160' has the function of forming a nozzle 4 having a tapered shape, as already illustrated in FIG. 1*b*. In particular, according to the type of etch that is used for removing the narrowing layer 160 and the duration of the etch itself, the narrowing element 160' can assume a triangular shape (in cross-sectional view) or else a shape (in cross-sectional view) given by the union of a triangular portion and a quadrangular portion, where the quadrangular portion extends as a prolongation of the triangular portion. In perspective view, this shape resembles the superposition of a frustoconical portion on a cylindrical portion. Obviously, given that the narrowing element 160' is monolithic and made of one and the same material, the two portions extend one after another with continuity, and without a clear separation. It is evident that this description of the narrowing element 160' is qualitative. Irregularities with respect to the ideal geometrical shape described, due to the manufacturing process, are possible.

During the step of FIG. 25 an etch of the intermediate layer 152 exposed through the opening 158 is moreover carried out. Said etch is represented, in FIG. 25, as an etch configured to remove for the entire thickness (along Z) the portion of the intermediate layer 152 exposed through the opening 158.

However, according to a different embodiment, said etch may be partial, i.e., such as to remove only a fraction of the thickness (along Z) of the portion of the intermediate layer 152 exposed through the opening 158, to form a recess in the intermediate layer 152 (this embodiment is not shown in the figure).

Figure 26:
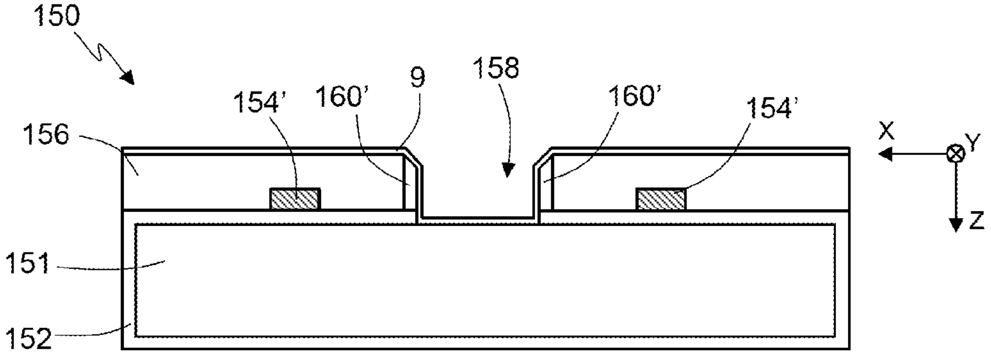

As shown in FIG. 26, the protective layer 9 is formed on the structural layer 156, on the narrowing element 160', and inside the opening 158 (in particular on the surface portion of the substrate 151 exposed through the opening 158, as described with reference to FIG. 25).

In the case where during the step of FIG. 25 just a fraction of the thickness (along Z) of the portion of the intermediate layer 152 exposed through the opening 158 is etched, the protective layer 9 extends in the recess of the intermediate layer 152 exposed through the opening 158.

According to an embodiment of the present disclosure, the protective layer 9 is deposited by means of the ALD (Atomic-Layer Deposition) technique, by depositing a material chosen from among silicon carbide, alumina, hafnium oxide, titanium, tantalum, tungsten, and/or alloys thereof.

Other CVD techniques may, however, be used.

Figure 27:
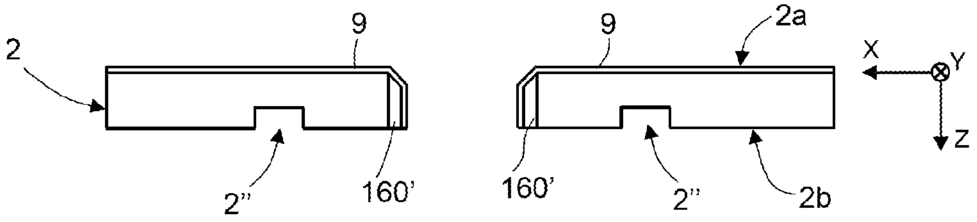

As shown in FIG. 27, a step of grinding in a region corresponding to the bottom face 151*b* of the substrate 151 enables complete removal of the intermediate layer 152 that extends in an area corresponding to the bottom face 151*b* of the substrate 151, the substrate 151, and the portion of the protective layer 9 that extends on the substrate 151, so as to reach the structural layer 156.

Also in the case where the protective layer 9 is formed in a recess of the intermediate layer 152, the grinding step enables removal thereof.

The surface of the structural layer 156, previously coupled to the intermediate layer 152, is now exposed. It is hence possible to carry out a selective etch for removing the sacrificial region 154', to form a trench that provides the recess 2" described with reference to FIG. 1*b*.

A subsequent step of deposition of protective material (for example, silicon carbide, alumina, hafnium oxide, titanium, tantalum, tungsten, and/or alloys thereof) at the second face 2*b* of the plate 2 enables extension of the protective layer 9 also as far as the second face 2*b*, so as protect it from any possible aggression due to the fluid ejected by the nozzle 4 during use.

In this way, the plate 2 is formed comprising a nozzle 4 surrounded by the recess 2", as described with reference to FIG. 1*b*. According to this embodiment, the plate 2 has a first face 2*a* covered by the protective layer 9 and a second face 2*b* that has the recess 2' and the nozzle 4.

Finally, it is possible to form the ejection channel 8 by coupling a substrate to the plate 2, in a way similar to what has already been described with reference to FIG. 12, and not described any further herein.

It is to be appreciated that various steps of the methods may be performed sequentially, parallel, omitted or in an order different from the order that is illustrated.

Figure 28:
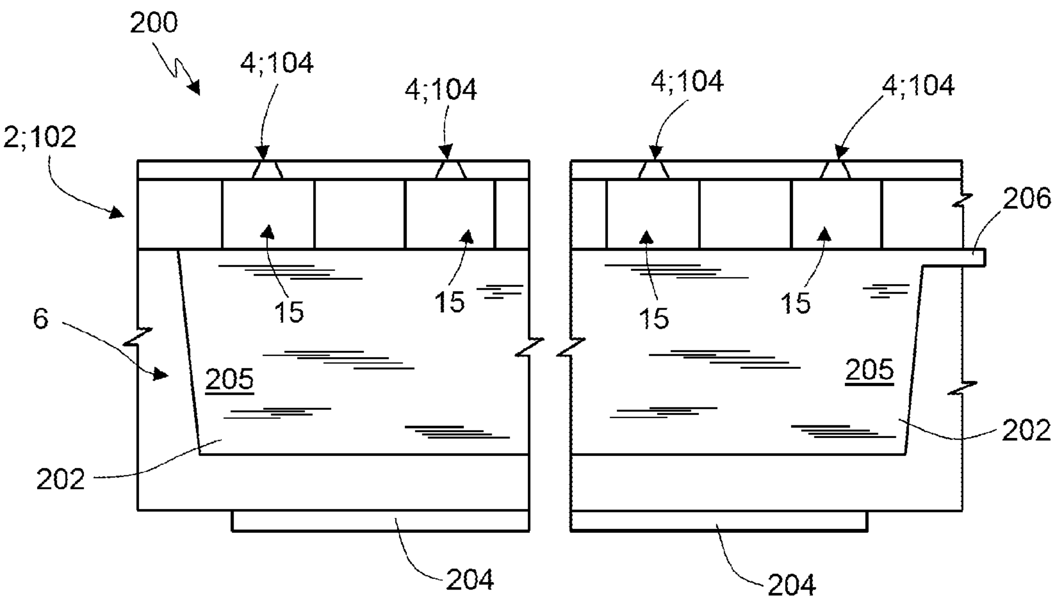
FIG. 28 is a lateral sectional view of a fluid-ejection device, comprising a nozzle plate housing a plurality of nozzles.

FIG. 28 shows a fluid-ejection device 200 comprising a plate 2 or 102 provided with a plurality of nozzles 4 or 104 and produced according to the method of FIG. 2-12, or according to the method of FIG. 13-19, or according to the method of FIGS. 20-27.

The fluid-ejection device 200 comprises a reservoir 6, set underneath the plate 2, 102 and configured to contain in an internal housing 202 of its own a liquid or fluid substance 205 (for example, ink) that, in use, must be made to come out of the nozzles 4; 104 through the ejection channels 6. Actuation of the fluid-ejection device 200 can be obtained in various ways, for example by an actuator 204 of a piezoelectric type, fixed with respect to a bottom face of the reservoir 6 opposite to the nozzle plate 2. Alternatively, a plurality of actuators of a piezoelectric type or thermal ink jet type can be provided (in a way not shown), set in an area corresponding to a respective nozzle 4, 104, for example immediately underneath the respective nozzle 4, 104, in the ejection channel 8.

According to a further embodiment, actuation of the fluid-ejection device 200 is of a continuous type, in which the reservoir 6 is a continuously pressurized reservoir.

Other modalities of arrangement of the actuators are, however, possible. For example, each nozzle 4, 104 can be fluidically coupled to a respective reservoir, and each reservoir can be provided with a respective actuation element 204. Or again, a set of nozzles 4, 104 is fluidically coupled to one and the same reservoir, and another set of nozzles is fluidically coupled to a further reservoir. The reservoirs can be filled with fluids different from one another.

With reference to FIG. 28, when activated by means of an appropriate control electronics (not illustrated), the actuator 204 induces a vibration that is transmitted through the reservoir 6 to the fluid 205 contained in the housing 202, causing exit thereof through the nozzles 4, 104.

Provided according to one embodiment is an inlet mouth 206 for recharging the reservoir 6 with further liquid or fluid substance when this, following upon use of the fluid-ejection device 200, is used up. Alternatively, the fluid-ejection device 200 is of a non-rechargeable type, and the inlet mouth 206 is omitted.

According to one embodiment of the present disclosure, the fluid-ejection device 200 is a printing cartridge, for printers of an ink jet type.

Figure 29:
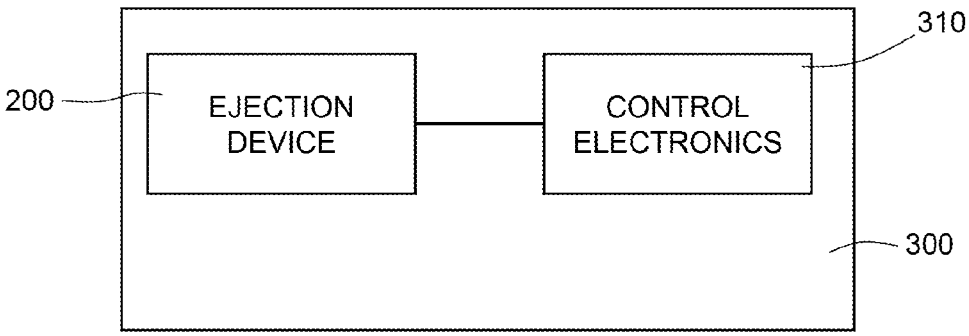
FIG. 29 illustrates a printing machine comprising the ejection device of FIG. 1*a* or FIG. 1*b* or FIG. 28.

FIG. 29 shows schematically an ink jet printer 300 provided with a fluid-ejection device 200 (having the function of printing cartridge) which comprises a nozzle plate 2, 102 having a plurality of nozzles 4, 104 of the type described according to the present disclosure, and obtained according to the teachings of the present disclosure.

The ink jet printer 300 further comprises a control electronics 310, comprising a control card and/or a microprocessor and/or a memory for governing and managing the printing operations. The control electronics 310 can further comprise a frequency oscillator operatively coupled to the actuator 204 for controlling the frequency of oscillation of the actuator 204, in the case where the latter is of a piezoelectric type.

From an examination of the characteristics of the disclosure obtained according to the present disclosure the advantages afforded are evident.

In particular, with the disclosure according to the present disclosure is fully obtained via a manufacturing process compatible with manufacturing technologies of a MEMS type, starting from a wafer made of semiconductor material of a standard type. Moreover, the manufacturing process described entails a limited number of processing steps, making possible industrial production of items with low cost an high yield.

Furthermore, the respective narrowing elements 20', 120', 160' formed as described previously, are self-aligned, respectively, to the openings 18, 118, 158 so that a further step of alignment of the narrowing elements 20', 120', 160' with the hole that defines the nozzle 4 is not required.

Finally, it is clear that modifications and variations may be made to what has been described and illustrated herein, without thereby departing from the sphere of protection of the present disclosure, as defined in the annexed claims.

It is evident that the steps of the method described with reference to FIGS. 2-12, 13-19, 20-27 (according to the respective embodiments of the present disclosure) can be applied to the production of a plurality of nozzles housed in one and the same nozzle plate 2.

According to a further embodiment, a recess 2' (of the same type as the one of FIG. 1*a*) can house a plurality of nozzles 4.

According to a further embodiment, a trench recess 2" (of the same type as the one of FIG. 1*b*) can surround a plurality of nozzles 4.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process for forming a nozzle plate for a fluid-ejection device, the process comprising:

forming a structural layer over a first side of a first substrate of semiconductor material, the structural layer having a respective first side and second side, the second side of the structural layer facing the first side of the first substrate;

forming a first through hole in the structural layer by removing a portion of the structural layer, said first through hole having sidewalls that extend between an inlet section at the first side of the structural layer and an outlet section at the second side of the structural layer;

depositing a narrowing element on the sidewalls of the first through hole;

tapering the narrowing element so that the inlet section of the first through hole has an area larger than a respective area of the outlet section of the first through hole by anisotropically etching the narrowing element, wherein the tapered narrowing element has a constant thickness; and removing the first substrate.

2. The process according to claim 1, further comprising forming, in a position corresponding to the second side of the structural layer, a recess configured to at least partially surround the outlet section of the first through hole.

3. The process according to claim 2, wherein said recess has a perimeter having a shape that is one of a polygonal, polygonal with rounded corners, circular, oval, circular with rounded corners, and oval with rounded corners.

4. The process according to claim 2, wherein forming the first through hole comprises forming said outlet section of the first through hole in said recess.

5. The process according to claim 2, wherein forming said recess comprises forming a trench path, and forming the first through hole comprises forming said outlet section of the first through hole enclosed by said trench path.

6. The process according to claim 1, wherein:

forming the narrowing element comprises depositing, in the first through hole, a narrowing layer; and tapering the narrowing element comprises etching the narrowing layer in an etching direction that is substantially parallel to the surface of the first through hole.

7. The process according to claim 1, further comprising forming a surface-modification layer inside the first through hole that covers and protects the narrowing element.

8. The process according to claim 7, wherein forming the surface-modification layer comprises depositing, on the narrowing element, a material that includes at least one of silicon carbide, alumina, hafnium oxide, titanium, tantalum, tungsten, and alloys thereof.

9. The process according to claim 7, wherein forming the surface-modification layer comprises forming the surface-modification layer on portions of the narrowing element and of the structural layer facing the first substrate.

10. The process according to claim 1, further comprising:

forming an intermediate layer over the first side of the first substrate;

wherein forming the structural layer comprises forming said structural layer over the intermediate layer; and wherein forming the recess comprises:

etching the intermediate layer in a region corresponding to the inlet section of said first through hole; and removing a portion of the intermediate layer extending between the narrowing element and the first substrate, and between a portion of the structural layer adjacent to the narrowing element and the first substrate by further etching the intermediate layer.

11. The process according to claim 1, further comprising:

forming an intermediate layer over the first side of the first substrate; and forming a sacrificial island on the intermediate layer; and wherein:

forming the structural layer comprises forming said structural layer on the intermediate layer and over the sacrificial island;

forming the first through hole comprises forming said first through hole on the sacrificial island, and in such a way that the first through hole is contained by the sacrificial island; and forming the recess comprises forming a cavity extending partially between the first substrate and the structural layer, and between the first substrate and the narrowing element by selectively etching the sacrificial island and a portion of the intermediate layer extending underneath the sacrificial island.

12. The process according to claim 11 further comprising forming a surface-modification layer inside the first through hole that covers and protects the narrowing element, and wherein forming the surface-modification layer comprises forming the surface-modification layer in surface portions of the narrowing element and of the structural layer facing said cavity.

13. The process according to claim 1, further comprising:

forming a recess in the second side of the structural that at least partially surrounds the outlet section of the first through hole;

forming an intermediate layer over the first face of the first substrate; and forming a sacrificial island, defining a parameter of said recess, on the intermediate layer, the sacrificial island defining a region of the intermediate layer internal to said path and a region of the intermediate layer external to said path; and wherein:

forming the structural layer comprises forming said structural layer over the intermediate layer and on the sacrificial island;

forming the first through hole comprises forming said first through hole in the region of the intermediate layer internal to said path; and wherein forming the recess comprises:

selectively removing the first substrate and the intermediate layer; and selectively etching the sacrificial island.

14. A process for forming a nozzle plate, the process comprising:

forming a structural layer over a substrate, the structural layer having a through hole having first and second ends that are separated by sidewalls;

depositing a first material on the sidewalls of the through hole;

forming a tapered narrowing element in a first portion of the first material proximate the first end by anisotropically etching the first material, a second portion of the first material having a constant thickness; and forming the nozzle plate by removing the substrate.

15. The process according to claim 14, further comprising forming a recess in the structural layer proximate the first end of the through hole.

16. The process according to claim 15, wherein the recess is a distance from the first end of the through hole.

17. The process according to claim 15, wherein the recess extends from the first end of the through hole.

18. The process according to claim 14, wherein forming the structural layer over the substrate comprises growing an epitaxial layer and etching the through hole in the structural layer.

19. The process according to claim 14, wherein the structural layer has opposing first and second surfaces, wherein the sidewalls of the through hole extend perpendicularly from the first and second surfaces.

20. The process according to claim 19, wherein depositing the first material on the sidewalls of the through hole comprises depositing the first material on the sidewalls of the through hole with a constant thickness.

21. The process according to claim 14, wherein the substrate is a first substrate and the through hole is a first through hole, the process further comprising:

etching a second through hole through a second substrate; and coupling the second substrate and the structural layer together with the second through hole aligned with the first through hole.

* * * * *